US010314149B2

(12) United States Patent
Hidaka et al.

(10) Patent No.: US 10,314,149 B2
(45) Date of Patent: Jun. 4, 2019

(54) LIGHTING CONTROL DEVICE AND LIGHTING SYSTEM

(71) Applicant: PANASONIC INTELLECTUAL PROPERTY MANAGEMENT CO., LTD., Osaka (JP)

(72) Inventors: Yuto Hidaka, Osaka (JP); Hiroshi Sugawara, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/926,487

(22) Filed: Mar. 20, 2018

(65) Prior Publication Data

US 2018/0288859 A1 Oct. 4, 2018

(30) Foreign Application Priority Data

Mar. 28, 2017 (JP) ................................ 2017-063938

(51) Int. Cl.

| | |
|---|---|
| ***H05B 37/02*** | (2006.01) |
| ***H05B 33/08*** | (2006.01) |
| ***G06K 9/00*** | (2006.01) |

(52) U.S. Cl.

CPC ..... *H05B 37/0272* (2013.01); *G06K 9/00624* (2013.01); *H05B 33/086* (2013.01); *H05B 33/0845* (2013.01)

(58) Field of Classification Search

CPC ............ H05B 37/0272; H05B 33/0845; H05B 33/086; G06K 9/00624

USPC .......................................................... 315/291

See application file for complete search history.

(56) References Cited

U.S. PATENT DOCUMENTS

| | | | | |
|---|---|---|---|---|
| 2012/0323591 | A1* | 12/2012 | Bechtel | G06F 19/321 705/2 |
| 2015/0115836 | A1* | 4/2015 | Ohta | H05B 37/02 315/294 |
| 2015/0185720 | A1 | 7/2015 | Kazuno et al. | |
| 2017/0290132 | A1* | 10/2017 | Amrine | H05B 33/0845 |

FOREIGN PATENT DOCUMENTS

| | | | |
|---|---|---|---|
| JP | 2010-020972 | A | 1/2010 |
| JP | 2010-213045 | A | 9/2010 |
| JP | 2014-017542 | A | 1/2014 |
| JP | 2016-149325 | A | 8/2016 |

* cited by examiner

*Primary Examiner* — Don P Le

(74) *Attorney, Agent, or Firm* — McDermott Will & Emery LLP

(57) ABSTRACT

A lighting control device that controls the lighting state of a luminaire is provided. The lighting control device includes a storage that stores control information for sequentially changing the lighting state of the luminaire, a detector that detects an operation of a remote controller that remotely operates the lighting state of the luminaire, and a controller that controls the lighting state of the luminaire based on the control information. The control information includes first scene information for a current lighting state and second scene information for a next lighting state. Each time the detector detects an operation of the remote controller, the controller changes the lighting state of the luminaire from the current lighting state to the next lighting state indicated in the second scene information.

17 Claims, 17 Drawing Sheets

FIG. 2

(a)

SWITCH 40a

| GROUP | REPRODUCTION ORDER | DIMMING RATE | COLOR TEMPERATURE |
|---|---|---|---|
| ALL | 0 | BASED ON SCHEDULE INFORMATION | |
| | 1 (SCENE 1a) | 100% | 4000 K |
| | 2 (SCENE 2a) | 50% | 4000 K |
| | 3 (SCENE 3a) | 0% | - |

(b)

SWITCH 40b

| GROUP | REPRODUCTION ORDER | DIMMING RATE | COLOR TEMPERATURE |
|---|---|---|---|
| GROUP 1 | 0 | BASED ON SCHEDULE INFORMATION | |
| | 1 (SCENE 1b) | 100% | 5000 K |
| | 2 (SCENE 2b) | 50% | 4000 K |
| | 3 (SCENE 3b) | 5% | 3000 K |
| | 4 (SCENE 4b) | 0% | - |

(c)

SWITCH 40c

| GROUP | REPRODUCTION ORDER | DIMMING RATE | COLOR TEMPERATURE |
|---|---|---|---|
| GROUP 1 | 0 | BASED ON SCHEDULE INFORMATION | |
| | 1 (SCENE 1c) | 10% | 2700 K |
| | 2 (SCENE 2c) | 5% | 2700 K |

(d)

SWITCH 40d

| GROUP | REPRODUCTION ORDER | DIMMING RATE | COLOR TEMPERATURE |
|---|---|---|---|
| GROUP 2 | 0 | BASED ON SCHEDULE INFORMATION | |
| | 1 (SCENE 1d) | 5% | 6500 K |
| | 2 (SCENE 2d) | 10% | 6500 K |

FIG. 7A

| USER OPERATION | CONTROL STATE OF SWITCH 40b | CONTROL STATE OF SWITCH 40c | LIGHTING STATE OF LUMINAIRE(S) IN GROUP 1 |
|---|---|---|---|
| INITIAL | SCHEDULE INFORMATION | SCHEDULE INFORMATION | SCHEDULE INFORMATION |
| 40b PRESSED | SCENE 1b | SCHEDULE INFORMATION | SCENE 1b |
| 40c PRESSED | SCENE 1b | SCENE 1c | SCENE 1c |
| 40b PRESSED | SCENE 2b | SCENE 1c | SCENE 2b |
| ⋮ | ⋮ | ⋮ | ⋮ |

FIG. 7B

| USER OPERATION | CONTROL STATE OF SWITCH 40b | CONTROL STATE OF SWITCH 40c | LIGHTING STATE OF LUMINAIRE(S) IN GROUP 1 |
|---|---|---|---|
| INITIAL | SCHEDULE INFORMATION | SCHEDULE INFORMATION | SCHEDULE INFORMATION |
| 40b PRESSED | SCENE 1b | SCHEDULE INFORMATION | SCENE 1b |
| 40c PRESSED | SCHEDULE INFORMATION | SCENE 1c | SCENE 1c |
| 40b PRESSED | SCENE 1b | SCHEDULE INFORMATION | SCENE 1b |
| ⋮ | ⋮ | ⋮ | ⋮ |

FIG. 13

(a)

SPOT MODE

| REPRODUCTION ORDER | DIMMING RATE | COLOR TEMPERATURE |
|---|---|---|
| 0 (SCENE 11a) | 50 | 4000 K |
| 1 (SCENE 12a) | 100% | 2700 K |

(b)

5-STAGE DIMMING MODE

| REPRODUCTION ORDER | DIMMING RATE | COLOR TEMPERATURE |
|---|---|---|
| 0 (SCENE 11b) | 100% | 4000 K |
| 1 (SCENE 12b) | 80% | 4000 K |
| 2 (SCENE 13b) | 60% | 4000 K |
| 3 (SCENE 14b) | 40% | 4000 K |
| 4 (SCENE 15b) | 20% | 4000 K |

LIGHTING CONTROL DEVICE AND LIGHTING SYSTEM

CROSS REFERENCE TO RELATED APPLICATION

This application claims the benefit of priority of Japanese Patent Application Number 2017-063938 filed on Mar. 28, 2017, the entire content of which is hereby incorporated by reference.

BACKGROUND

1. Technical Field

The present disclosure relates to a lighting control device and a lighting system including the lighting control device.

2. Description of the Related Art

Conventionally, a control device (lighting control device) including a schedule function for turning on or off or changing the brightness of a luminaire over time is known (for example, see Japanese Unexamined Patent Application Publication No. 2014-017542). Japanese Unexamined Patent Application Publication No. 2014-017542 discloses transitioning the dimming level of a luminaire via a wall switch.

SUMMARY

Improving the user-friendliness of the above-described lighting control device is desired.

Accordingly, an object of the present disclosure is to provide a lighting control device and a lighting system that are more user friendly.

In order to achieve the above-described object, a lighting control device according to one aspect of the present disclosure controls a lighting state of a luminaire, and includes a storage that stores control information for sequentially changing the lighting state of the luminaire; a detector that detects an operation of a remote controller that remotely operates the lighting state of the luminaire; and a controller that controls the lighting state of the luminaire based on the control information. The control information includes first scene information for a current lighting state and second scene information for a next lighting state. Each time the detector detects an operation of the remote controller, the controller changes the lighting state of the luminaire from the current lighting state to the next lighting state indicated in the second scene information.

In order to achieve the above-described object, a lighting system according to one aspect of the present disclosure includes a luminaire and the above-described lighting control device that controls a lighting state of the luminaire based on control information stored in a storage.

The lighting control device and the lighting system according to one aspect of the present disclosure improve user friendliness.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 2 illustrates one example of control information according to Embodiment 1;

FIG. 7A illustrates one example of lighting states of a luminaire or luminaires and control states of switches each time a switch is operated, when the lighting state corresponding to a switch is maintained, in a lighting system according to Embodiment 1;

FIG. 7B illustrates one example of lighting states of a luminaire or luminaires and control states of switches each time a switch is operated, when the lighting state corresponding to a switch is reset, in a lighting system according to Embodiment 1;

FIG. 13 is a flow chart illustrating examples of modes included in a lighting control device according to Embodiment 2.

DETAILED DESCRIPTION OF THE EMBODIMENTS

The following describes exemplary embodiments of the present disclosure with reference to the drawings. Each of the embodiments described below is a general or specific example. The numerical values, shapes, materials, elements, arrangement and connection of the elements, steps, order of the steps, etc., indicated in the following embodiments are given merely by way of illustration and are not intended to limit the present disclosure. Therefore, among elements in the following embodiments, those not recited in any one of the independent claims defining the broadest inventive concept of the present disclosure are described as optional elements.

Note that the figures are schematic illustrations and are not necessarily precise depictions. Moreover, in the figures, elements that are essentially the same share like reference signs. Accordingly, duplicate description is omitted or simplified.

Embodiment 1

Hereinafter, Embodiment 1 will be described with reference to FIG. 1 through FIG. 8.

(1-1. Lighting System Configuration)

First, the configuration of a lighting system according to this embodiment will be described with reference to FIG. 1.

Figure 1:
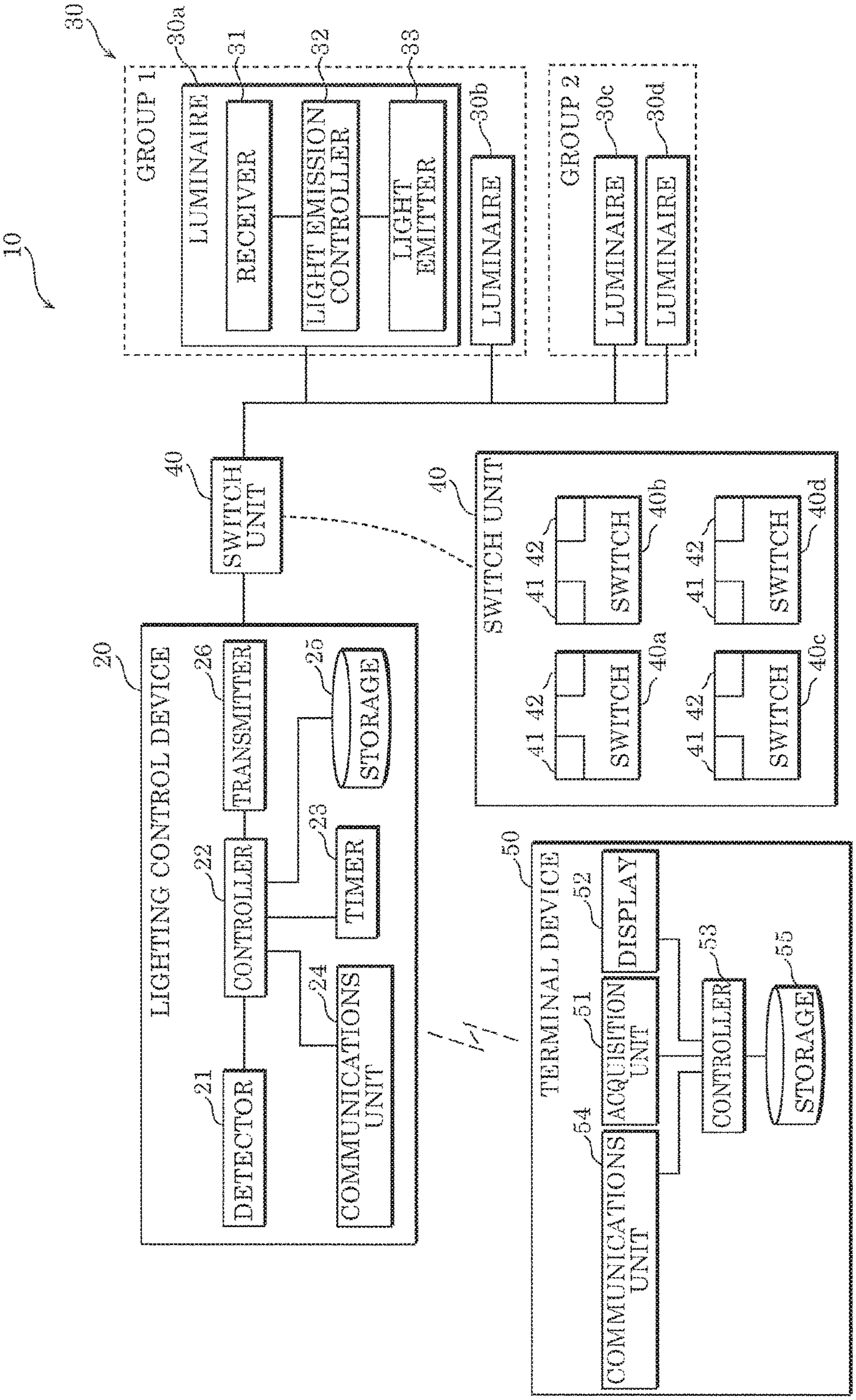
FIG. 1 is a block diagram illustrating a functional configuration of a lighting system according to Embodiment 1.

FIG. 1 is a block diagram illustrating a functional configuration of lighting system 10 according to this embodiment.

As illustrated in FIG. 1, lighting system 10 according to this embodiment includes lighting control device 20, a plurality of luminaires 30, switch unit 40, and terminal device 50. Switch unit 40 included in lighting system 10 includes one or more switches. When the user operates a switch, lighting control device 20 controls the plurality of luminaires 30 according to a lighting state associated with that switch. More specifically, when the user operates a switch, lighting control device 20 controls the plurality of luminaires 30 according to a lighting state associated with that switch based on control information stored in advance in storage 25 for controlling the lighting state of luminaires 30. Note that the number of luminaires 30 included in lighting system 10 is not particularly limited. For example, lighting system 10 may include one luminaire 30.

Lighting system 10 includes a schedule function for changing at least one of the dimming or color of the plurality of luminaires 30 over time. Next, each element included in lighting system 10 will be described.

(1-1-1. Lighting Control Device)

Lighting control device 20 is a control device that controls a lighting state of luminaire 30 by transmitting a dimming rate and color temperature to luminaire 30. The dimming rate and color temperature are information transmitted from terminal device 50 and stored in lighting control device 20 in advance. Stated differently, lighting control device 20 controls a lighting state of luminaires 30 included in lighting system 10 based on information transmitted from terminal device 50. For example, a dimming rate of 100% equates to a state in which luminaire 30 is fully on and a dimming rate of 0% equates to a state in which luminaire 30 is completely off.

Lighting control device 20 is a device that is physically separate from luminaires 30 and does not include a lighting function itself. Lighting control device 20 includes detector 21, controller 22, timer 23, communications unit 24, storage 25, and transmitter 26.

Detector 21 is a detection device that detects operation of switch unit 40. In this embodiment, switch unit 40 includes four switches (for example, switch 40*a* through switch 40*d*). Detector 21 detects which of the four switches has been operated (for example, pressed down). For example, detector 21 may determine that a switch has been operated by detecting the switch becoming conductive from being operated. Detector 21 outputs a detection result to controller 22.

Controller 22 is a control device that carries out various types of control by performed by lighting control device 20. When detector 21 detects operation of switch unit 40 (any one of switches 40*a* through 40*d*), controller 22 controls a lighting state of one or more luminaires 30 in accordance with the detected switch 40*a* through switch 40*d*. Each of switches 40*a* through 40*d* is assigned with group-related information relating to a group of one or more luminaires, lighting state information relating to one or more lighting states of each luminaire included in the group (for example, two or more items of scene information), and reproduction order information relating to the order in which the two or more items of scene information are reproduced. This will be described in more detail later. Stated differently, for each of switches 40*a* through 40*d*, group-related information, lighting state information, and reproduction order information is stored in storage 25. Note that scene information is information indicating a luminaire dimming rate and color temperature. Reproduction order information is information indicating the order in which two or more items of scene information are reproduced. Scene information is one example of non-time-changing scene information.

When detector 21 detects operation of a switch (for example, switch 40*a*), controller 22 reads, from storage 25, the group-related information, the two or more items of scene information, and the reproduction order information corresponding to operated switch 40*a*, and controls each luminaire included in the group in accordance with the dimming rate and color temperature indicated in the read two or more items of scene information in accordance with the read reproduction order information.

Note that the group-related information, the two or more items of scene information, and the reproduction order information corresponding to a switch are examples of the control information. More specifically, they are examples of first control information included in the control information. Stated differently, controller 22 controls a lighting state of luminaire 30 based on the detection result of detector 21 and control information (more specifically, first control information). Note that the first control information is stored in advance in storage 25.

Note that the lighting state information is not limited to scene information. For example, lighting state information may include slide show information which is a combination of two or more items of scene information. Slide show information is one example of non-time-changing scene information.

Next, control information stored in lighting control device 20 will be described with reference to FIG. 2. Note that FIG. 2 illustrates an example in which the control information (more specifically, the first control information) includes scene information.

FIG. 2 illustrates one example of control information according to this embodiment. More specifically, FIG. 2 illustrates examples of control information (one example of first control information) corresponding to each of switches 40*a* through 40*d*. Control information corresponding to switch 40*a* is illustrated in (a) in FIG. 2, control information corresponding to switch 40*b* is illustrated in (b) in FIG. 2, control information corresponding to switch 40*c* is illustrated in (c) in FIG. 2, and control information corresponding to switch 40*d* is illustrated in (d) in FIG. 2.

Moreover, in (a) through (d) in FIG. 2, the lighting information corresponding to phase 0 in the reproduction order is shown as schedule information. Schedule information is information in which at least one of scene information and slide show information is associated with temporal information relating to the reproduction of the lighting state indicated by the at least one of the scene information and the slide show information (for example, time stamp information indicating the start and end times of the lighting state). Moreover, the schedule information is one example of second control information. Note that schedule information may be set daily, per weekday, per month, per season, per year, etc. The user can freely select when the schedule information is set. Moreover, second control information includes group-related information and reproduction order information corresponding to a switch. Note that the second control information is stored in advance in storage 25. Schedule information is one example of time-changing scene information.

As illustrated in (a) in FIG. 2, control information corresponding to switch 40*a* includes second control information and first control information. The second information includes group-related information indicating "all" (for example, all of the luminaires 30 included in lighting system 10), reproduction order information indicating phase "0", and schedule information as information for the dimming rate and color temperature. The first control information includes group-related information indicating "all", reproduction order information indicating phases "1" through "3", and scene information (scenes 1*a* through 3*a*) corresponding to each phase in the reproduction order as information for the dimming rate and color temperature.

In this embodiment, one characteristic of the control information corresponding to a switch is that it includes information relating to a plurality of lighting states and reproduction order information, which is information relating to the order in which the plurality of lighting states are reproduced. Stated differently, one switch is assigned with a plurality of lighting states. This is true for switch 40*b* through switch 40*d* as well, as is illustrated in (b) through (d) in FIG. 2.

Note that the control information does not include temporal information for reproduction of the scene information or schedule information (for example, information relating to a point in time at which the scene information is reproduced or an interval during which the scene information is reproduced).

Controller 22 controls the lighting state of luminaire 30 based on control information including, as described above, a plurality of lighting states and information relating to the order in which the plurality of lighting states are reproduced. More specifically, each time detector 21 detections operation of switch unit 40, controller 22 changes the scene information that luminaire 30 reproduces based on the control information and causes luminaire 30 to reproduce the lighting state indicated by the changed scene information. For example, controller 22 controls luminaire 30 by transmitting, via transmitter 26, a control signal including a dimming rate and color temperature to luminaire 30. For example, each time detector 21 detects an operation of switch unit 40 by a user, controller 22 transmits, to luminaire 30 via transmitter 26, a control signal including a dimming rate and color temperature different from the dimming rate and color temperature before the detection of the operation. Note that the control of luminaire 30 by controller 22 will be described in detail later.

Moreover, controller 22 controls lighting states of first indicator lamp 41 and second indicator lamp 42 (to be described later) included in each of switches 40*a* through 40*d* in accordance with the lighting state of luminaire 30. Note that the control of first indicator lamp 41 and second indicator lamp 42 by controller 22 will be described in detail later.

Moreover, when controller 22 acquires an ON instruction based on the schedule information, controller 22 controls the dimming rate and color temperature of luminaire 30 based on schedule information in accordance with the instruction. More specifically, when controller 22 acquires an ON instruction based on the schedule information, controller 22 reads the schedule information stored in storage 25, identifies the dimming rate and color temperature indicated in the scene information or slide show information corresponding to the current time as notified by timer 23, and controls the lighting state of luminaire 30 in accordance with the identified dimming rate and color temperature. Note that lighting control device 20 acquires the ON instruction based on the schedule information from, for example, terminal device 50. Stated differently, lighting control device 20 does not acquire the ON instruction based on the schedule information via operation of switch unit 40.

Controller 22 is, more specifically, a microcomputer, but may be implemented as a processor or a dedicated circuit, for example.

Timer 23 measures and notifies controller 22 of the current time. Timer 23 is, more specifically, a generic timer integrated circuit (IC) (timer circuit) or a real-time clock IC. Note that timer 23 may be internally provided in controller 22. In such a case, timer 23 is implemented as, for example, an on-chip oscillator. When timer 23 is implemented as an on-chip oscillator, the measuring precision of the current time can be increased by additionally providing an external quartz crystal.

Communications unit 24 receives, from terminal device 50, control information associated with switch unit 40 that includes, for example, a plurality of lighting states for luminaires 30. Communications unit 24 receives scene information, slide show information, and schedule information from terminal device 50. Note that the scene information, slide show information, and schedule information are each one example of control information. Communications unit 24 is, more specifically, a communications circuit (communications module), and receives, for example, control information from communications unit 54 included in terminal device 50 via wireless communication. Note that the communication method used between communications unit 24 (lighting control device 20) and terminal device 50 is not particularly limited. Examples of the communication method used between communications unit 24 and terminal device 50 include wireless communication based on a communications protocol, such as specified low power radio, ZigBee®, Bluetooth®, or WiFi®.

Storage 25 is a storage device that stores, for example, control information transmitted from terminal device 50 and received via communications unit 24. Storage 25 also stores a control program executed by controller 22.

Storage 25 is, specifically, a storage device such as semiconductor memory. Storage of information into storage 25 is performed by controller 22. Note that storage 25 may be internally provided in controller 22.

Transmitter 26 transmits a control signal including a dimming rate and color temperature to luminaire 30. In other words, transmitter 26 transmits a dimming rate and color temperature. Transmitter 26 is, specifically, a communications circuit (communications module), and transmits the dimming rate and color temperature via wired communication. Wired communication is, for example, power line communication (PLC) or communication over a wired local area network (LAN).

Note that lighting control device 20 may include a power supply (not illustrated in the drawings) that converts alternating current (AC) power supplied from an energy grid (for example, a utility power supply) into direct current (DC)

power suitable for operation of lighting control device 20, and supplies the converted power. The power supply is, more specifically, a power supply circuit including, for example, an AC/DC converter or DC/DC converter.

(1-1-2. Luminaire)

Next, luminaire 30 will be described. Note that lighting system 10 according to this embodiment includes four luminaires, namely luminaires 30*a* through 30*d*. Each luminaire 30*a* through 30*d* has the same configuration. Accordingly, in the description, "luminaire 30" is also used to refer to any given one of the luminaires 30*a* through 30*d*.

Luminaire 30 is a ceiling light that provides in-door lighting. Luminaire 30 emits light at a brightness and color in accordance with the dimming rate and color temperature received from lighting control device 20. In other words, the dimming and color of and luminaire 30 are controlled by lighting control device 20. Note that luminaire 30 is exemplified as, but not limited to, a ceiling light; luminaire 30 may be, for example, a down light. Moreover, in this embodiment, lighting system 10 is exemplified as including a plurality of luminaires 30, but lighting system 10 may include one or more luminaires 30. Luminaire 30 includes receiver 31, light emission controller 32, and light emitter 33.

Receiver 31 receives a control signal including a dimming rate and color temperature from lighting control device 20. In other words, receiver 31 receives a dimming rate and color temperature. Receiver 31 is, specifically, a communications circuit (communications module), and receives the dimming rate and color temperature via wired communication from transmitter 26 included in lighting control device 20.

Light emission controller 32 supplies, to light emitter 33, voltage and current in accordance with the dimming rate and color temperature received via receiver 31. Light emission controller 32 includes, specifically, a control circuit (for example, a pulse width modification (PWM) circuit), and controls the dimming and color of light. For example, light emission controller 32 controls the dimming rate by changing the voltage and current it supplies to light emitter 33. Moreover, when light emitter 33 includes light-emitting elements that emit light of different colors (for example, includes a light-emitting element that emits blue light and a light-emitting element that emits red light), light emission controller 32 controls the color temperature by changing the ratios of the voltage and current supplied to the light-emitting elements.

Light emission controller 32 includes a microcomputer, processor, or dedicated circuit that controls, for example, a control circuit. Stated differently, the embodiment of light emission controller 32 is not particularly limited.

Light emitter 33 is a light-emitting module that emits light when supplied with voltage and current from light emission controller 32. Light emitter 33 includes, more specifically, a light-emitting diode (LED) as a light-emitting element. For example, light emitter 33 may include a plurality of LEDs that emit light of different colors. Moreover, light emitter 33 may include a fluorescent tube, a semiconductor light-emitting element such as a semiconductor laser, or a solid-state light-emitting element such as an organic electroluminescent (EL) element or an inorganic EL element.

Note that luminaire 30 may include a power supply (not illustrated in the drawings) that converts AC power or DC power supplied from an external source into DC power suitable for operation of luminaire 30, and supplies the converted power. The power supply is, more specifically, a power supply circuit including, for example, an AC/DC converter or DC/DC converter.

(1-1-3. Switch Unit)

Switch unit 40 is disposed between lighting control device 20 and the plurality of luminaires 30 and spaced apart from the plurality of luminaires 30. Switch unit 40 is a switch for remotely operating, for example, the lighting states of the plurality of luminaires 30. Switch unit 40 is a switch that is fixed to a part of a building, and is, for example, a wall switch disposed on a wall of a room. Note that switch unit 40 is one example of a remote controller that remotely operates, for example, the lighting state of luminaire 30.

Switch unit 40 receives an operation with respect to luminaire 30 from a user. In this embodiment, switch unit 40 includes four switches, namely switch 40*a* through switch 40*d*. Note that the number of switches included in switch unit 40 is not limited to four; switch unit 40 may include one or more switches.

As illustrated in FIG. 2, each of switches 40*a* through 40*d* is assigned with different control information. More specifically, each of switches 40*a* through 40*d* is assigned with, for example, a group, a plurality of lighting states for each luminaire included in the assigned group, and an order for the plurality of lighting states. Note that the information assigned to switches 40*a* through 40*d* is stored in storage 25 in lighting control device 20.

Note that operation of switch unit 40 does not include operation via terminal device 50. Stated differently, switch unit 40 does not include an operational screen (for example, a screen showing the switches) displayed on the display of an operator terminal such as terminal device 50.

Moreover, as illustrated in FIG. 1, each of switches 40*a* through 40*d* includes first indicator lamp 41 and second indicator lamp 42. As described above, each of switches 40*a* through 40*d* is assigned with scene information and schedule information. First indicator lamp 41 and second indicator lamp 42 are displays that display whether the current lighting state of luminaire 30 is a lighting state based on scene information or a lighting state based on schedule information. More specifically, first indicator lamp 41 and second indicator lamp 42 are light-emitting devices that emit light of mutually different colors. For example, when luminaire 30 is being controlled based on scene information, first indicator lamp 41 emits light and second indicator lamp 42 does not emit light. Moreover, for example, when luminaire 30 is being controlled based on schedule information, second indicator lamp 42 emits light and first indicator lamp 41 does not emit light. With this, the user can know whether luminaire 30 is being controlled based on scene information or schedule information by checking the lighting states of first indicator lamp 41 and second indicator lamp 42 included in switches 40*a* through 40*d*.

Note that first indicator lamp 41 and second indicator lamp 42 are, collectively, one example of a lighting unit. Moreover, the lighting unit is not limited to including two indicator lamps that emit light of mutually different colors. For example, the lighting unit may include a single indicator lamp that emits light of two different colors, and controller 22 may change the color of the light emitted by the indicator lamp in accordance with whether the control is based on scene information or schedule information. Moreover, the lighting state of the lighting unit is controlled by, for example, controller 22.

(1-1-4. Terminal Device)

Terminal device 50 is an operator terminal that transmits, to lighting control device 20 via wireless communication, control information for controlling the lighting states of the plurality of luminaires 30 included in lighting system 10.

As illustrated in FIG. 1, terminal device 50 includes acquisition unit 51, display 52, controller 53, communications unit 54, and storage 55.

Acquisition unit 51 is a user interface that receives, from a user, an operation (instruction) relating to a lighting state of luminaire 30 and an operation for generating control information. For example, acquisition unit 51 is a touch panel. When acquisition unit 51 is implemented as a touch panel, acquisition unit 51 and display 52 (for example, a liquid crystal display) are adhered together.

For example, acquisition unit 51 acquires a selection result in response to the user touching, from among lighting states displayed on display 52, a location in which a lighting state desired to be selected is displayed. Note that, for example, acquisition unit 51 is not limited to a touch panel; acquisition unit 51 may be implemented as a pressable button or a keyboard, for example.

Display 52 is a display device that displays information for controlling luminaire 30 and/or information for generating control information. For example, display 52 is a liquid crystal display.

Controller 53 is a device that controls components included in terminal device 50. For example, upon receiving an operation relating to a lighting state via acquisition unit 51, controller 53 generates information associated with the lighting state and transmits the generated information to lighting control device 20 via communications unit 54. Upon receiving an operation for generation of control information via acquisition unit 51, controller 53 transmits the generated control information to lighting control device 20 via communications unit 54.

Controller 53 is a processor that executes a control program stored in storage 55, but may be implemented as a microcomputer or a dedicated circuit, for example.

Communications unit 54 transmits, from terminal device 50 to lighting control device 20, control information for controlling the lighting state of luminaire 30. Communications unit 54 is, more specifically, a communications circuit (communications module), and transmits, for example, control information to communications unit 24 included in lighting control device 20 via wireless communication. Note that the communication method used between communications unit 54 (terminal device 50) and communications unit 24 (lighting control device 20) is not particularly limited. Examples of the communication method used between communications unit 54 and communications unit 24 include wireless communication based on a communications protocol, such as specified low power radio, ZigBee®, Bluetooth®, or WiFi®.

Storage 55 is a storage device that stores, for example, control information transmitted to lighting control device 20. Storage 55 also stores a control program executed by controller 53.

Storage 55 is, specifically, a storage device such as semiconductor memory. Storage of information into storage 55 is performed by controller 53. Note that storage 55 may be internally provided in controller 53.

Using terminal device 50, the user creates control information—including scene information, slide show information, and schedule information—via acquisition unit 51, and transmits the created control information to lighting control device 20 via communications unit 54 to store the created control information in storage 25 of lighting control device 20. Moreover, using terminal device 50, the user divides (groups) the plurality of luminaires 30 into two or more groups and transmits the resulting group-related information to lighting control device 20 via communications unit 54 to store the group-related information in storage 25 of lighting control device 20. A group is a collection of one or more luminaires determined by the user. Group information is information in which each group is associated with unique identification information (for example, a device ID) for each luminaire included in the group. Note that the group information is one example of control information. Moreover, for example, terminal device 50 acquires identification information for the plurality of luminaires 30 included in lighting system 10 from lighting control device 20, and groups the plurality of luminaires 30 using the acquired identification information.

In this embodiment, the plurality of luminaires 30 are exemplified as being divided into two groups, namely group 1 and group 2. As illustrated in FIG. 1, luminaires 30*a* and 30*b* belong to group 1, and luminaires 30*c* and 30*d* belong to group 2. Note that the number of luminaires included in a single group is not limited. Each group may include one or more luminaires. Moreover, the number of luminaires included in a group may differ from group to group.

Then, the user sets up switch unit 40 included in lighting system 10 with information indicating the group associated with that switch unit 40, the plurality of lighting states for the luminaire or luminaires included in the group, and the reproduction order of the plurality of lighting states. In this embodiment, lighting system 10 includes four switches, namely switches 40*a* through 40*d*. The user sets the above-described information for each of the four switches 40*a* through 40*d* using terminal device 50. This assigns each of switches 40*a* through 40*d* with, for example, a group and a plurality of lighting states.

Note that terminal device 50 is exemplified as, but not limited to, a tablet terminal; terminal device 50 may be implemented as, for example, a high-functioning cellular phone (i.e., a smart phone), a cellular phone, a controller terminal designed for a specific use, or a personal computer (PC).

Note that the lighting state of luminaire 30 included in lighting system 10 is controllable using terminal device 50.

(1-2. Generation of Control Information)

Next, the generation of control information—including group-related information, lighting state information, and reproduction order information—associated with a switch and stored in storage 25 of lighting control device 20 will be described.

The control information is generated via a user using terminal device 50. Next, the order in which the control information is generated by the user will be described with reference to FIG. 3.

Figure 3:
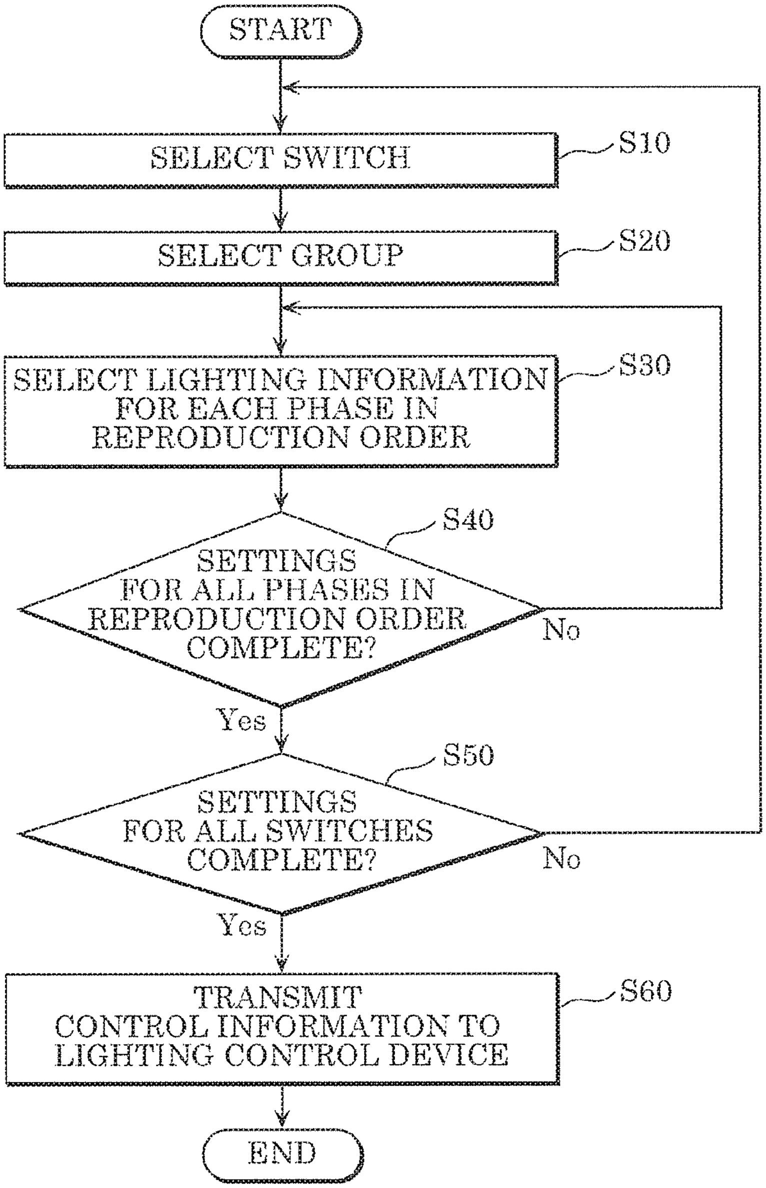
FIG. 3 is a flow chart illustrating an order in which the control information according to Embodiment 1 is generated.

FIG. 3 is a flow chart illustrating an order in which the control information according to this embodiment is generated. Note that the scene information, schedule information, and group-related information are exemplified as being stored in advance in storage 25 of lighting control device 20. Moreover, terminal device 50 is exemplified as having acquired information on switch unit 40 included in lighting system 10 from lighting control device 20 (in this embodiment, information on switches 40*a* through 40*d*). Moreover, in this example, each switch is assigned with a single group.

First, the user selects, from the acquired information on switch unit 40, a switch to generate the control information (S10). In this embodiment, the user selects one of the four switches 40*a* through 40*d* to generate the control information. For example, switches 40*a* through 40*d* are displayed on display 52, and the user selects a switch via acquisition unit 51. For example, assume the user selects switch 40*a*. Hereinafter, an example will be given in which the control information corresponding to switch 40*a* illustrated in (a) in FIG. 2 is generated.

Next, the user selects a group to be controlled by the selected switch 40*a* (stated differently, selects a group to be assigned to switch 40*a*) (S20). For example, group information that is stored in advance is displayed on display 52, and the user selects a desired group via acquisition unit 51. This associates switch 40*a* with a group. For example, assume that the user selects "all" ("all" being a group including all luminaires 30 included in lighting system 10). Note that when a group is not already set or the user wishes to set a new group, a new group may be set in step S20.

When a predetermined group (for example, "all" in the case of switch 40*a*) is set in step S20, the user selects information relating to lighting states (lighting states indicating scene information or schedule information) assigned to switch 40*a* for each phase in the reproduction order (S30). For example, the user selects a lighting state for each phase in the reproduction order from among scene information or schedule information stored in advance in storage 25. Note that the user may set a dimming rate or color temperature different from that indicated in the stored scene information or schedule information.

For example, assume that schedule information is selected for phase 0 in the reproduction order, scene 1*a* (dimming rate of 100% and color temperature of 4000K) is selected as scene information for phase 1 in the reproduction order, scene 2*a* (dimming rate of 50% and color temperature of 4000K) is selected as scene information for phase 2 in the reproduction order, and scene 3*a* (dimming rate of 0%, i.e., off) is selected as scene information for phase 3 in the reproduction order. Note that the number of phases in the reproduction order varies depending on the number of items of scene information or schedule information selected. In this example, since four items of scene information or schedule information were selected, the reproduction order includes phases 0 through 3. For example, as illustrated in (b) in FIG. 2, when five items of scene information or schedule information are set, the reproduction order includes phases 0 through 4. This makes it possible to set up a switch with a plurality of lighting states.

Then, when the user is done selecting the desired number of lighting information items (i.e., when the user is done selecting lighting states for all phases in the reproduction order in accordance with the number of desired lighting states) (yes in S40), processing confirms whether the setting of the control information for all switches (switches 40*a* through 40*d*) included in lighting system 10 is complete or not (S50). Note that when the user is not done selecting the desired number of lighting information items when the user is not done selecting lighting states for all phases in the reproduction order in accordance with the number of desired lighting states) (no in S40), processing returns to step S30 where the user selects lighting information for an empty phase in the reproduction order.

When the setting of the control information for all switches included in lighting system 10 is complete (yes in S50), the generated control information is transmitted to lighting control device 20 via communications unit 54 (S60). For example, the control information is transmitted upon acquisition unit 51 receiving a transmission instruction from the user. Note that when the setting of the control information for all switches included in lighting system 10 is not complete (no in S50), processing returns to step S10, and steps S10 through S40 are preformed for the remaining switches.

(1-3. Operations Performed by Lighting Control Device)

Next, operations performed by lighting control device 20 in lighting system 10 will be described with reference to FIG. 4 through FIG. 8.

Figure 4:
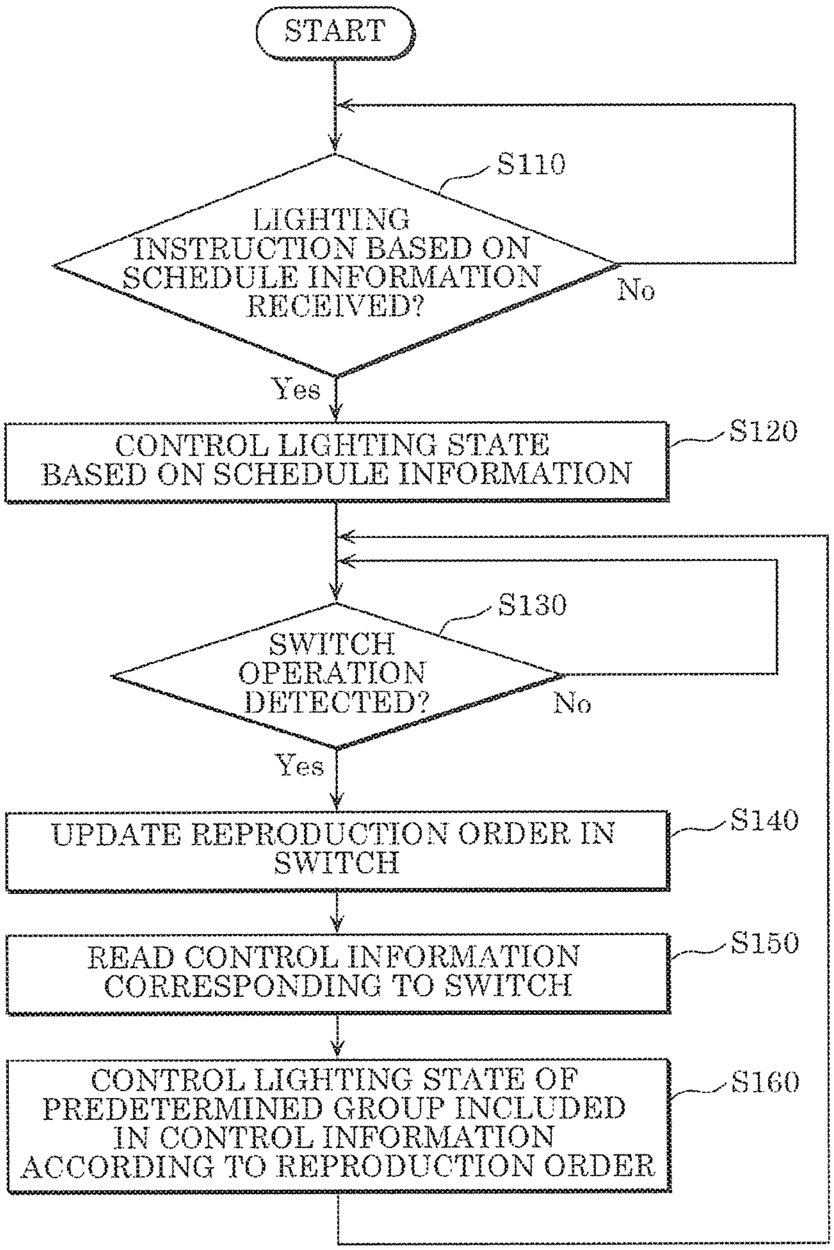
FIG. 4 is a flow chart illustrating operations performed by a lighting control device according to Embodiment 1.

FIG. 4 is a flow chart illustrating operations performed by lighting control device 20 according to this embodiment. Note that in the following description, control information is exemplified as being stored in advance in storage 25.

First, lighting control device 20 receives, from the user, an ON instruction based on the schedule information (yes in S110), and controls the lighting states of the plurality of luminaires 30 included in lighting system 10 so as to be in accordance with the lighting state based on the schedule information (S120). More specifically, when an ON instruction based on schedule information is received via communications unit 24, controller 22 reads that schedule information from storage 25. Controller 22 also acquires information indicating the current time from timer 23. Controller 22 then controls the plurality of luminaires 30 in accordance with the lighting state in the schedule information corresponding to the acquired information indicating the current time. Controller 22 controls the lighting states of the plurality of luminaires 30 by transmitting, to the plurality of luminaires 30 via transmitter 26, a control signal that is in accordance with the lighting state indicated by the schedule information.

Note that an ON instruction based on the schedule information is, for example, an instruction received from terminal device 50. Stated differently, the ON instruction does not originate from operation of switch unit 40. Moreover, for example, the ON instruction based on the schedule information may be an instruction that powers on each luminaire 30 included in a predetermined group or lighting system 10. In other words, the schedule information may be information indicating an initial lighting state of luminaire 30 when luminaire 30 is powered on. This makes it possible to suitably determine an initial lighting state of luminaire 30 when luminaire 30 is powered on, in accordance with, for example, the time of day that luminaire 30 is powered on.

Note that when lighting control device 20 does not receive an ON instruction based on the schedule information (no in S110), lighting control device 20 does not control the lighting state of luminaire 30. For example, if luminaire 30 is off, lighting control device 20 keeps luminaire 30 turned off. Moreover, for example, if luminaire 30 is emitting light based on some instruction, lighting control device 20 keeps luminaire 30 in the light-emitting state.

When luminaire 30 is emitting light based on the schedule information and detector 21 detects operation of switch unit 40 (yes in S130), controller 22 updates the reproduction order in switch unit 40 (S140). Controller 22 then reads control information corresponding to switch unit 40 from storage 25 (S150), and controls the lighting state of a predetermined group included in the read control information so as to be in accordance with the lighting state indicated in the scene information or schedule information according to the reproduction order included in the control information (S160). Processing then returns to step S130, and each time detector 21 detects operation of switch unit 40, detector 21 executes steps S140 through S160. This transitions the lighting state of luminaire 30 each time switch unit 40 is operated.

Note that when luminaire 30 is emitting light based on schedule information and detector 21 does not detect operation of switch unit 40 (no in S130), controller 22 continues performing control based on schedule information until detector 21 detects operation of switch unit 40.

Hereinafter, the lighting state of luminaire 30 per operation of switch unit 40 will be described with reference to FIG. 5.

Figure 5:
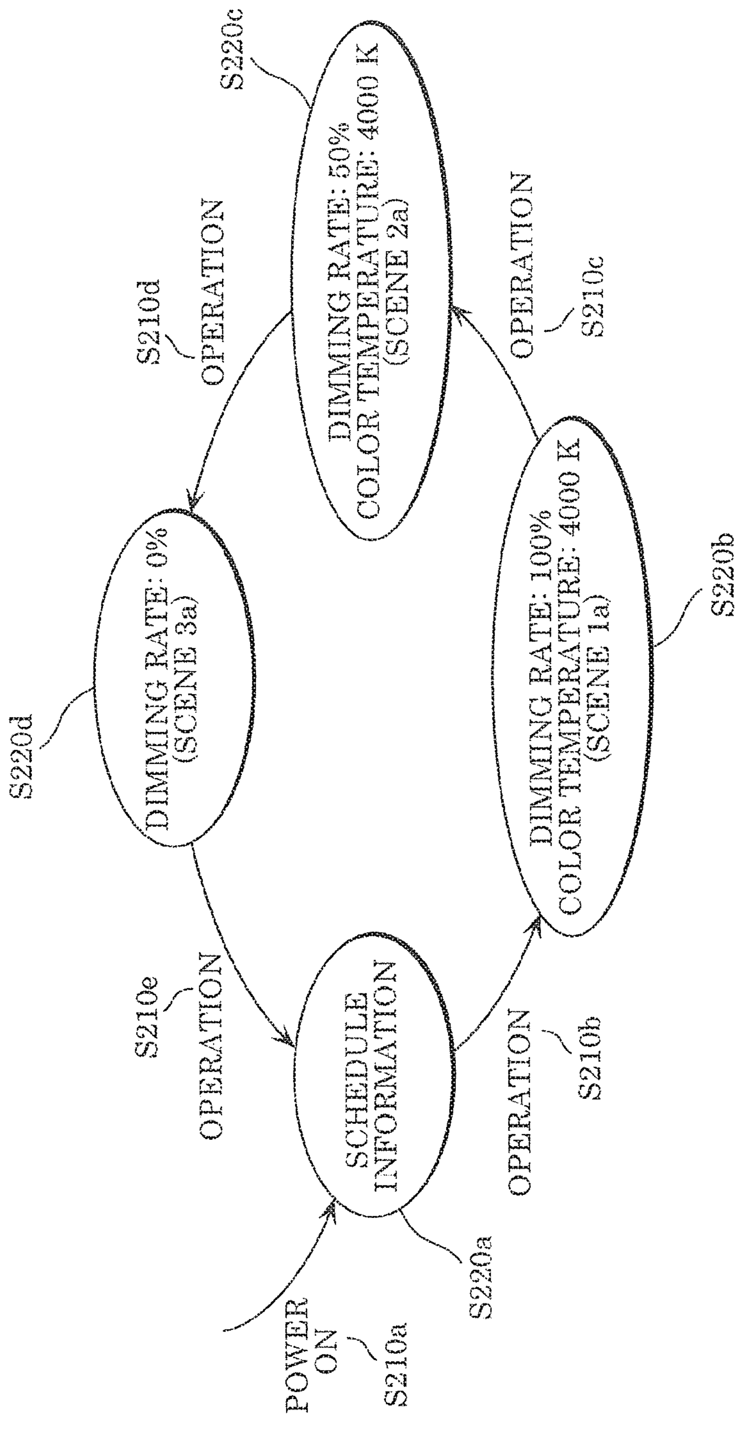
FIG. 5 illustrates transitions between lighting states of a luminaire prompted by operation of a switch in a lighting system according to Embodiment 1.

FIG. 5 illustrates transitions between lighting states of luminaire 30 prompted by operation of switch unit 40 in lighting system 10 according to this embodiment. More specifically, FIG. 5 illustrates transitions between lighting states of all luminaires 30 included in the group corresponding to switch 40*a*, prompted each time switch 40*a* is operated.

First, lighting system 10 is powered on (S210*a*). With this, all luminaires 30 included in lighting system 10 emit light. More specifically, all luminaires 30 emit light in accordance with a lighting state based on the schedule information, i.e., the lighting state associated with phase 0 in the reproduction order illustrated in (a) in FIG. 2 (S220*a*). In such a case, the schedule information, which is the current lighting state, is one example of first scene information. Note that when the lighting state corresponding to phase 0 in the reproduction order is predetermined scene information instead of schedule information, when lighting system 10 is powered on, luminaires 30 emit light in accordance with the predetermined scene information.

Next, when switch 40*a* is operated (S210*b*), luminaires 30 emit light at a dimming rate of 100% and a color temperature of 4000K (scene 1*a*), which is the lighting state corresponding to phase 1 after phase 0 in the reproduction order (S220*b*). More specifically, the lighting state of luminaires 30 transitions from the lighting state indicated by the schedule information (one example of first scene information) to the next lighting state indicated by scene 1*a* (one example of second scene information). In other words, when switch 40*a* is operated, luminaires 30 emit light in accordance with the lighting state indicated by scene 1*a*.

When switch 40*a* is operated again (S210*c*), luminaires 30 emit light at a dimming rate of 50% and a color temperature of 4000K (scene 2*a*), which is the lighting state corresponding to phase 2 after phase 1 in the reproduction order (S220*c*). More specifically, the lighting state of luminaires 30 transitions from the current lighting state indicated by scene 1*a* (one example of first scene information) to the next lighting state indicated by scene 2*a* (one example of second scene information). In other words, when switch 40*a* is operated, luminaires 30 emit light in accordance with the lighting state indicated by scene 2*a*.

When switch 40*a* is operated yet again (S210*d*), luminaires 30 emit light at a dimming rate of 0% (scene 3*a*), which is the lighting state corresponding to phase 3 after phase 2 in the reproduction order (S220*d*). More specifically, the lighting state of luminaires 30 transitions from the current lighting state indicated by scene 2*a* (one example of first scene information) to the next lighting state indicated by scene 3*a* (one example of second scene information). In other words, when switch 40*a* is operated, luminaires 30 emit light in accordance with the lighting state indicated by scene 3*a*. Note that a dimming rate of 0% means that light is not emitted.

When switch 40*a* is operated further again (S210*e*), the sequence returns to phase 0 from phase 3 in the reproduction order, and luminaires 30 emit light in accordance with the lighting state indicated in the schedule information, which is the lighting state corresponding to phase 0 in the reproduction order (S220*a*). More specifically, the lighting state of luminaires 30 transitions from the current lighting state indicated by scene 3*a* (one example of first scene information) to the next lighting state indicated in the schedule information (one example of second scene information). In other words, when switch 40*a* is operated, luminaires 30 emit light in accordance with the lighting state indicated in the schedule information.

Thereinafter, each time switch 40*a* is operated, the lighting state of luminaires 30 transitions in the order of steps S220*a* through S220*d*. Note that as a result of steps S130 through S160 in FIG. 4 being executed repeatedly in lighting control device 20, the lighting state of luminaires 30 transitions in the order of steps S220*a* through S220*d*.

Note that, as described above, first control information illustrated in (a) in FIG. 2 includes first scene information indicating the current lighting state and second scene information indicating the next lighting state.

Next, control performed by controller 22 when, for example, two different switches are set up with the same group, as is the case in (b) and (c) in FIG. 2, will be described with reference to FIG. 6A through FIG. 7B. In such a case, there are two methods performed by controller 22 for managing the reproduction order assigned to the switches. More specifically, when a second switch (for example, switch 40*c*) is operated while the lighting state of luminaire 30 is being controlled in response to a first switch (for example, switch 40*b*) being operated, the reproduction order assigned to the first switch is either maintained or not maintained. These are the two methods. First, the method of maintaining the reproduction order will be described with reference to FIG. 6A and FIG. 7A.

Figure 6A:
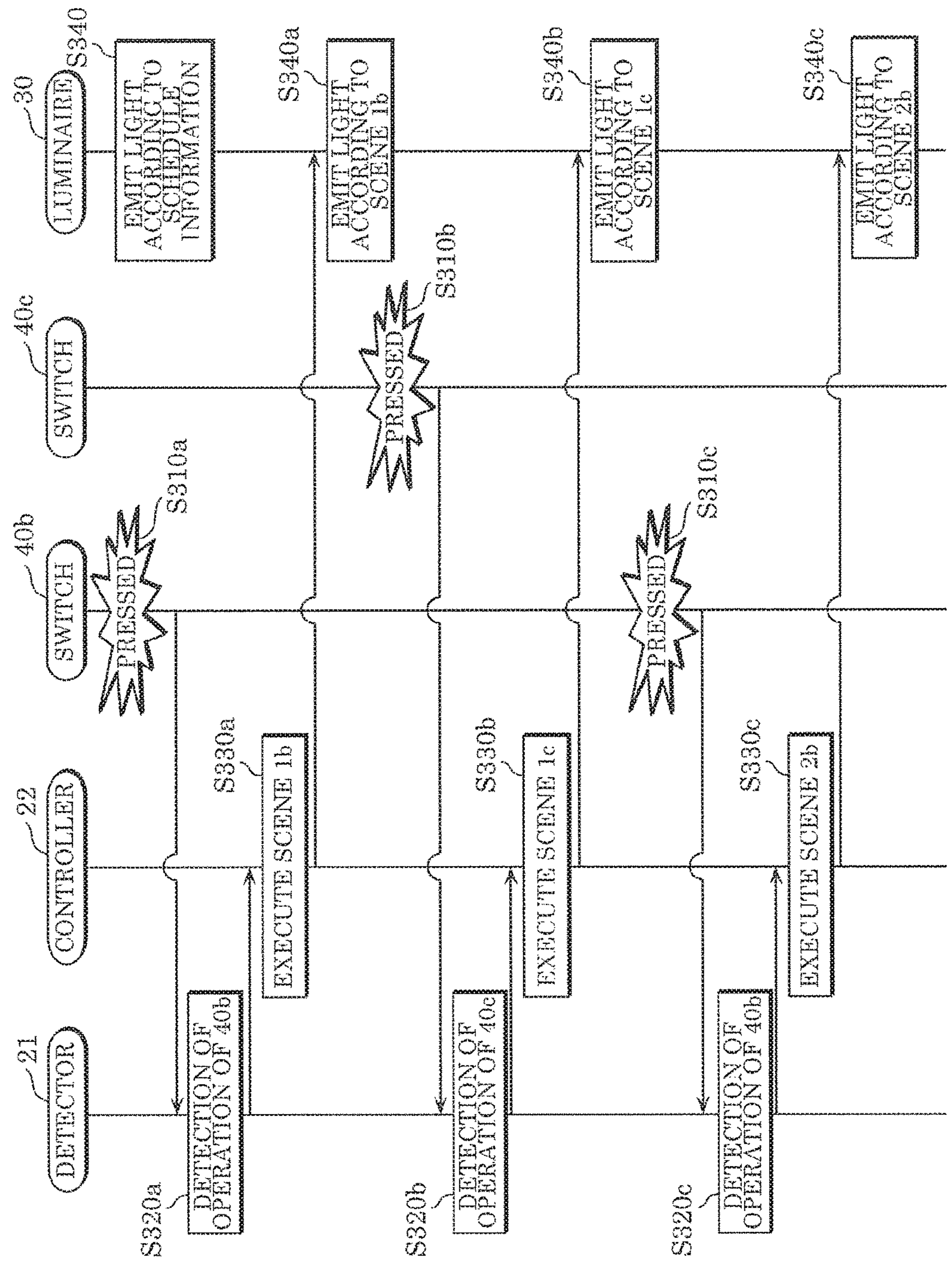
FIG. 6A is a sequence chart illustrating operations performed in a lighting system according to Embodiment 1 when the lighting state corresponding to a switch is maintained.

FIG. 6A is a sequence chart illustrating operations performed in lighting system 10 according to this embodiment when the lighting state corresponding to a switch is maintained. FIG. 7A illustrates one example of the lighting states of the luminaire or luminaires and the control states of the switches each time a switch is operated, in accordance with the method in which the lighting state corresponding to a switch is maintained, in lighting system 10 according to this embodiment. Note that in this example, while each luminaire 30 is emitting light based on schedule information (S340), firstly, switch 40*b* is operated (pressed), then switch 40*c* is operated (pressed), and lastly switch 40*b* is operated (pressed) once again. Moreover, switch 40*b* is one example of the first switch, and group 1, which is the group associated with switch 40*b*, is one example of the first group. Moreover, switch 40*c* is one example of the second switch, and group 1, which is the group associated with switch 40*c*, is one example of the second group. Moreover, in the description of FIG. 6A through FIG. 7B, the one or more luminaires 30 included in group 1, which are the one or more luminaires 3 to be controlled, may be referred to simply as luminaire 30.

First, when switch 40*b* is operated once (S310*a*), detector 21 detects the operation of switch 40*b* (S320*a*) and outputs the detection result to controller 22. Controller 22 updates the phase in the reproduction order assigned to switch 40*b* from 0 to 1 based on the detection result, reads the control information corresponding to switch 40*b*, and controls luminaire 30 included in group 1 corresponding to switch 40*b* in accordance with the lighting state indicated by scene 1*b* corresponding to phase 1 in the reproduction order indicated in the read control information (S330*a*). In other words, controller 22 causes the lighting state of luminaire 30 included in group 1 corresponding to switch 40*b* to transition from the current lighting state indicated in the schedule information (one example of first scene information) to the lighting state indicated by scene 1*b* (one example of second scene information) associated with switch 40*b*. This causes luminaire 30 to emit light in accordance with the lighting state indicated by scene 1_b_ (S340_a_). In such a case, as illustrated in FIG. 7A, controller 22 associates scene 1_b_ corresponding to phase 1 in the reproduction order with switch 40_b_, and associates the schedule information corresponding to phase 0 in the reproduction order with switch 40_c_. Moreover, since switch 40_b_ was operated, luminaire 30 is controlled in accordance with the lighting state indicated by scene 1_b_.

Then, as illustrated in FIG. 6A, when switch 40_c_ is operated while luminaire 30 is being controlled in accordance with scene 1_b_ (one example of first scene information) (S310_b_), detector 21 detects the operation of switch 40_c_ (S320_b_) and outputs the detection result to controller 22. Controller 22 updates the phase in the reproduction order assigned to switch 40_c_ from 0 to 1 based on the detection result, reads the control information corresponding to switch 40_c_, and controls luminaire 30 in accordance with the lighting state indicated by scene 1_c_ (one example of second scene information) corresponding to phase 1 in the reproduction order indicated in the read control information (S330_b_). In other words, controller 22 causes the lighting state of luminaire 30 included in group 1 corresponding to switch 40_c_ to transition from the lighting state indicated by scene 1_b_ to the lighting state indicated by scene 1_c_ associated with switch 40_c_. This causes luminaire 30 to emit light in accordance with the lighting state indicated by scene 1_c_ (S340_b_).

Here, controller 22 maintains the phase in the reproduction order assigned to switch 40_b_ at phase 1. In other words, controller 22 maintains the scene information corresponding to switch 40_b_ at scene 1_b_. In such a case, as illustrated in FIG. 7A, controller 22 associates scene 1_b_ corresponding to phase 1 in the reproduction order with switch 40_b_, and associates scene 1_c_ corresponding to phase 1 in the reproduction order with switch 40_c_. Moreover, since switch 40_c_ was operated, luminaire 30 is controlled in accordance with the lighting state indicated by scene 1_c_.

Then, as illustrated in FIG. 6A, when switch 40_b_ is operated while luminaire 30 is being controlled in accordance with scene 1_c_ (one example of first scene information) (S310_c_), detector 21 detects the operation of switch 40_b_ (S320_c_) and outputs the detection result to controller 22. Controller 22 updates the phase in the reproduction order assigned to switch 40_b_ from the hitherto maintained 1 to 2, reads the control information corresponding to switch 40_b_, and controls luminaire 30 in accordance with the lighting state indicated by scene 2_b_ (one example of second scene information) corresponding to phase 2 in the reproduction order indicated in the read control information (S330_c_). In other words, controller 22 causes the lighting state of luminaire 30 included in group 1 corresponding to switch 40_b_ to transition from the lighting state indicated by scene 1_c_ to the lighting state indicated by scene 2_b_ associated with switch 40_b_. This causes luminaire 30 to emit light in accordance with the lighting state indicated by scene 2_b_ (S340_c_). Here, controller 22 maintains the phase in the reproduction order assigned to switch 40_c_ at phase 1. In such a case, as illustrated in FIG. 7A, controller 22 associates scene 2_b_ corresponding to phase 2 in the reproduction order with switch 40_b_, and associates scene 1_c_ corresponding to phase 1 in the reproduction order with switch 40_c_. Moreover, since switch 40_b_ was operated, luminaire 30 is controlled in accordance with the lighting state indicated by scene 2_b_.

With this, even when a plurality of switches are set to the same group, it is possible to control the lighting state of luminaire 30 in accordance with the reproduction order set by the user for each of the switches.

Next, the method in which the reproduction order is not maintained will be described with reference to FIG. 6 and FIG. 7B.

Figure 6B:
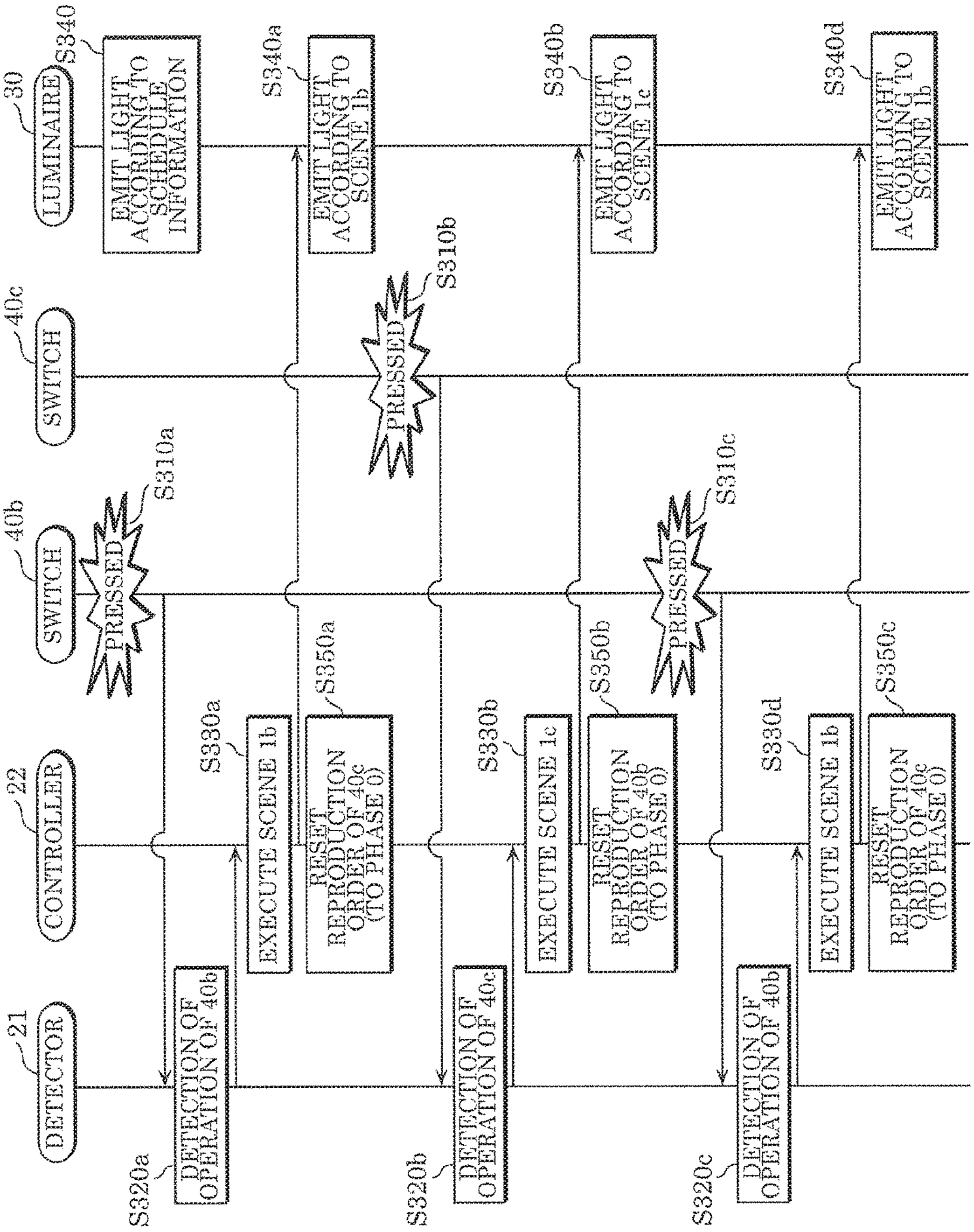
FIG. 6B is a sequence chart illustrating operations performed in a lighting system according to Embodiment 1 when the lighting state corresponding to a switch is reset.

FIG. 6B is a sequence chart illustrating operations performed in lighting system 10 according to this embodiment when the lighting state corresponding to a switch is not maintained. FIG. 7B illustrates one example of the lighting states of the luminaire or luminaires and the control states of the switches each time a switch is operated, in accordance with the method in which the lighting state corresponding to a switch is reset (i.e., is not maintained), in lighting system 10 according to this embodiment. Note that in this example, firstly, switch 40_b_ is operated, then switch 40_c_ is operated, and lastly switch 40_b_ is operated once again. Moreover, since the processing from when the initial operation of switch 40_b_ is detected until luminaire 30 is caused to emit light in accordance with the lighting state indicated by scene 1_b_ (steps S340 through S340_a_) are the same as in the method in which the reproduction order is maintained, repeated description thereof is omitted.

First, when switch 40_b_ is operated once, controller 22 updates the phase in the reproduction order assigned to switch 40_b_ from 0 to 1 and controls luminaire 30 in accordance with the lighting state indicated by scene 1_b_ corresponding to phase 1 in the reproduction order (S310_a_ through S330_a_). This causes luminaire 30 to emit light in accordance with the lighting state indicated by scene 1_b_ (S340_a_). Then, controller 22 updates the phase in the reproduction order assigned to switch 40_c_ to phase 0. Stated differently, controller 22 resets the phase in the reproduction order assigned to switch 40_c_ to phase 0 (initial value) (S350_a_).

Then, as illustrated in FIG. 6B, when switch 40_c_ is operated while luminaire 30 is being controlled in accordance with scene 1_b_ (one example of first scene information) (S310_b_), detector 21 detects the operation of switch 40_c_ (S320_b_) and outputs the detection result to controller 22. Controller 22 updates the phase in the reproduction order assigned to switch 40_c_ from 0 (initial value) to 1 based on the detection result, reads the control information corresponding to switch 40_c_, and controls luminaire 30 in accordance with the lighting state indicated by scene 1_c_ (one example of second scene information) corresponding to phase 1 in the reproduction order indicated in the read control information (S330_b_). In other words, controller 22 causes the lighting state of luminaire 30 included in group 1 corresponding to switch 40_c_ to transition from the current lighting state indicated by scene 1_b_ (one example of first scene information) to the lighting state indicated by scene 1_c_ (one example of second scene information) associated with switch 40_c_. This causes luminaire 30 to emit light in accordance with the lighting state indicated by scene 1_c_ (S340_b_). Stated differently, controller 22 resets the phase in the reproduction order assigned to switch 40_b_ from phase 1 to phase 0 (initial value) (S350_b_). In other words, controller 22 updates the scene information corresponding to switch 40_b_ from scene 1_b_ to schedule information (one example of third scene information). In such a case, as illustrated in FIG. 7B, controller 22 associates schedule information corresponding to phase 0 in the reproduction order with switch 40_b_, and associates scene 1_c_ corresponding to phase 1 in the reproduction order with switch 40_c_. Moreover, since switch 40_c_ was operated, luminaire 30 is controlled in accordance with the lighting state indicated by scene 1_c_.

Then, as illustrated in FIG. 6B, when switch 40*b* is operated while luminaire 30 is being controlled in accordance with scene 1*c* (S310*c*), detector 21 detects the operation of switch 40*b* (S320*c*) and outputs the detection result to controller 22. Controller 22 updates the phase in the reproduction order assigned to switch 40*b* from 0—to which the phase was previously reset—to 1, reads the control information corresponding to switch 40*b*, and controls luminaire 30 in accordance with the lighting state indicated by scene 1*b* corresponding to phase 1 in the reproduction order indicated in the read control information (S330*d*). This causes luminaire 30 to emit light in accordance with the lighting state indicated by scene 1*b* (S340*d*). Here, controller 22 resets the phase in the reproduction order assigned to switch 40*c* from phase 1 to phase 0 (initial value) (S350*c*). In such a case, as illustrated in FIG. 7B, controller 22 associates scene 1*b* corresponding to phase 1 in the reproduction order with switch 40*b*, and associates the schedule information corresponding to phase 0 in the reproduction order with switch 40*c*. Moreover, since switch 40*b* was operated, luminaire 30 is controlled in accordance with the lighting state indicated by scene 1*b*.

With this, even when a plurality of switches are set to the same group, since the reproduction order is reset each time a switch is operated (switched), when the user switches a switch, it is possible to reproduce the lighting states indicated in the control information corresponding to the switch in the order indicated by the reproduction order starting from phase 1.

Note that methods for managing the reproduction order when the plurality of switches are set up with the same group were described with reference to FIG. 6A through FIG. 7B, but the methods are not limited to when the plurality of switches are set up with the same group. For example, among the plurality of switches, when the one or more luminaires 30 included in a group assigned to a switch are not exclusive to that group (stated differently, are non-exclusively included in that group), as illustrated in (a) and (b) in FIG. 2, the methods for managing the reproduction order exemplified in FIG. 6A through FIG. 7B may be implemented. Here, "non-exclusive" means that in a case in which two switches are assigned with different groups, at least one luminaire 30 belongs to both groups. Note that when a group assigned to a plurality of switches is exclusive, the reproduction order of the switch is maintained, for example. Stated differently, when a group assigned to a plurality of switches is exclusive, one switch is not affected by operation of another switch.

Moreover, as described above, switch unit 40 includes a lighting unit. In this embodiment, each of switches 40*a* through 40*d* includes first indicator lamp 41 and second indicator lamp 42 that emit light of mutually different colors. In one non-limiting example, first indicator lamp 41 emits green light and second indicator lamp 42 emits red light. Moreover, the lighting states of first indicator lamp 41 and second indicator lamp 42 (for example, the turning on and off of first indicator lamp 41 and second indicator lamp 42) are controlled by, for example, controller 22. Control of first indicator lamp 41 and second indicator lamp 42 by controller 22 will be described with reference to FIG. 8.

Figure 8:
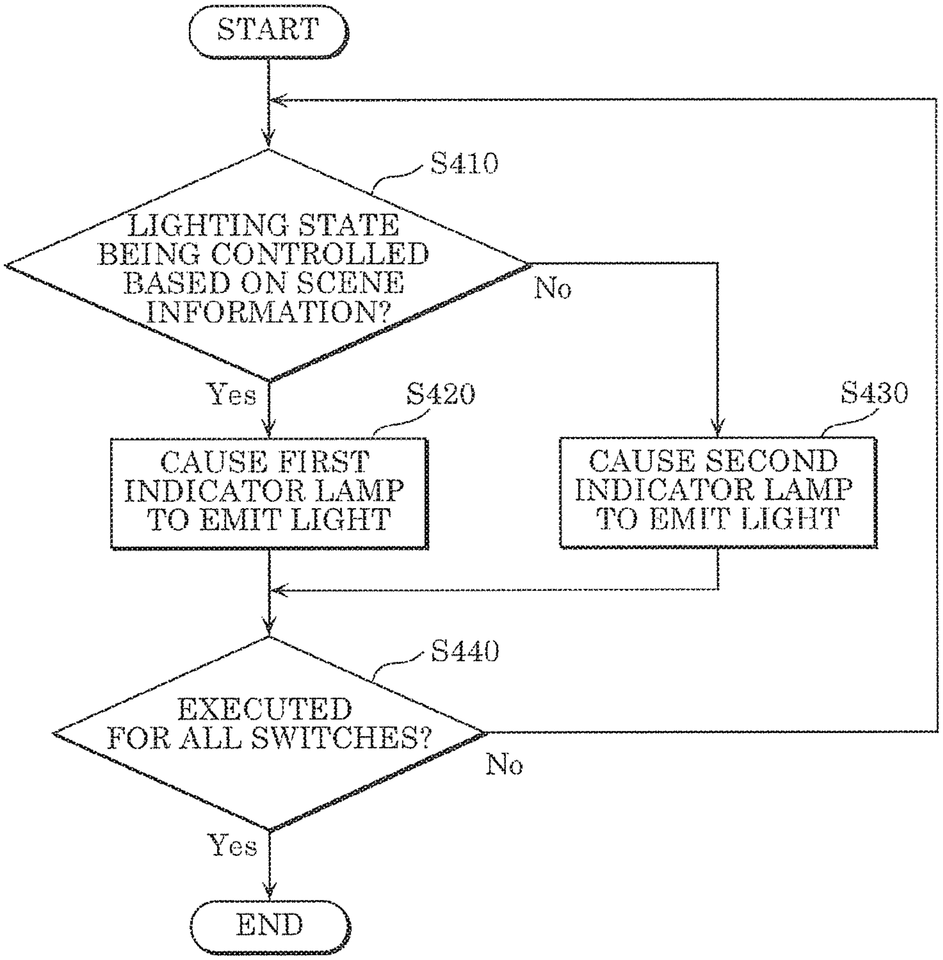
FIG. 8 is a flow chart illustrating operations performed by a controller for controlling a lighting state of a lighting unit according to Embodiment 1.

FIG. 8 is a flow chart indicating operations for controlling lighting states of first indicator lamp 41 and second indicator lamp 42 performed by controller 22 according to this embodiment.

First indicator lamp 41 and second indicator lamp 42 constitute a display that informs the user of whether the current lighting state of luminaire 30 is being controlled based on scene information (one example of first control information) or schedule information (one example of second control information). Accordingly, for each switch, controller 22 determines whether the current lighting state of each luminaire 30 included in a group corresponding to that switch is being controlled based on scene information (S410). For example, controller 22 may determine whether each luminaire 30 is being controlled based on scene information by checking the current phase in the reproduction order of the switch.

Controller 22 causes first indicator lamp 41 to emit light (S420) when the current lighting state of each luminaire 30 is being controlled based on scene information (yes in S410). With this, when each luminaire 30 included in a predetermined group is being controlled based on scene information, an indicator lamp of the switch associated with that group emits green light. Therefore, simply by looking at the switch, the user can know that the predetermined group associated to that switch is being controlled in accordance with the lighting state indicated in the scene information. Note that the illumination of first indicator lamp 41 when control is based on scene information is one example of the first lighting mode.

Moreover, controller 22 causes second indicator lamp 42 to emit light (S430) when the current lighting state of luminaire 30 is being controlled based on schedule information (no in S410). With this, when each luminaire 30 included in a predetermined group is being controlled based on schedule information, an indicator lamp of the switch associated with that group emits red light. Therefore, simply by looking at the switch, the user can know that the predetermined group associated to that switch is being controlled in accordance with the lighting state indicated in the schedule information. Note that the illumination of second indicator lamp 42 when control is based on schedule information is one example of the second lighting mode.

Then, when steps S420 and S430 have been executed for all switches (yes in S440), controller 22 ends control of first indicator lamp 41 and second indicator lamp 42, and when steps S420 and S430 have not been executed for all switches (no in S440), controller 22 returns to step S410 and continues the processing from there.

With this, the user can confirm whether each of the switches is being controlled in accordance with the lighting state indicated in the scene information or the lighting state indicated in the schedule information simply by looking at the color of the light emitted by first indicator lamp 41 or second indicator lamp 42 included in the switch. Note that steps S410 through S440 are executed, for example, each time step S160 illustrated in FIG. 4 is executed.

Note that in the example described above, the lighting modes of the lighting unit were exemplified as the emission of lights of different color (for example green light and red light), but this example is not limiting. For example, the lighting modes may be the emission or non-emission of light by the lighting unit, and may be continuous emission of light or emission of flashing light by the lighting unit. It is sufficient if the lighting unit includes two lighting states visibly discernible by the user. Moreover, the lighting unit is exemplified as, but not limited to, including two indicator lamps, namely first indicator lamp 41 second indicator lamp 42. So long as the lighting unit includes two lighting modes visibly discernibly by the user, the lighting unit may be configured of a single indicator lamp. For example, each switch may include a single indicator lamp as the lighting unit, and controller 22 may cause the indicator lamp to flash in the case of control in accordance with the lighting state indicated by scene information, and may cause the indicator lamp to either emit light continuously or not emit light in the case of control in accordance with schedule information.

(1-4. Advantageous Effects, Etc.)

As described above, lighting control device 20 controls a lighting state of luminaire 30, and includes: storage 25 that stores control information for sequentially changing the lighting state of luminaire 30; detector 21 that detects an operation of a switch unit 40 (one example of the remote controller) that remotely operates the lighting state of luminaire 30; and controller 22 that controls the lighting state of luminaire 30 based on the control information. The control information includes first scene information for a current lighting state and second scene information for a next lighting state. Each time detector 21 detects an operation of switch unit 40, controller 22 changes the lighting state of luminaire 30 from the current lighting state to the next lighting state indicated in the second scene information.

With this, the lighting state of luminaire 30 can be transitioned from the lighting state indicated in the first scene information included in the control information to the lighting state indicated in the second scene information included in the control information each time switch unit 40 is operated. Stated differently, lighting control device 20 can assign a plurality of items of scene information to a single switch. When only one item of scene information is assigned to a single switch, a different switch is required for each scene. This requires the user to search among a plurality of switches for, and operate the switch assigned with, the lighting state desired by the user, which is time consuming. In contrast, since lighting control device 20 according to this embodiment can assign a plurality of scenes to a single switch, the required number of switches can be reduced. Moreover, since scenes can be transitioned by operating a single switch, the user can easily reproduce the desired lighting state. Accordingly, lighting control device 20 improves user-friendliness.

Moreover, switch unit 40 (one example of the remote controller) includes switches 40*a* through 40*d* fixed to a wall (one example of a part of a building), and detector 21 detects an operation of switches 40*a* through 40*d*.

Since this makes it possible to assign a plurality of scenes to each of switches 40*a* through 40*d* fixed to a part of a building, it is therefore possible to reduce the number of switches that need to be fixed to, for example, the wall.

Moreover, each of the first scene information and the second scene information is one of non-time-changing scene information in which the lighting state does not change with time and time-changing scene information in which the lighting state changes with time. Switches 40*a* through 40*d* include first indicator lamp 41 and second indicator lamp 42 that emit light of mutually different colors (one example of the lighting unit including a first lighting mode and a second lighting mode different from the first lighting mode). Controller 22 causes first indicator lamp 41 to emit light (one example of causing the lighting unit to emit light in the first lighting mode) when controlling luminaire 30 in accordance with non-time-changing scene information, and causes second indicator lamp 42 to emit light (one example of causing the lighting unit to emit light in the second lighting mode) when controlling luminaire 30 in accordance with time-changing scene information.

With this, the user can confirm whether the current luminaire 30 is being controlled based on scene information or schedule information simply by looking at first indicator lamp 41 and second indicator lamp 42. Stated differently, when changing the lighting state of luminaire 30 from the current lighting state, since the user knows whether the current lighting state is based on the scene information or the schedule information, the user can easily change the lighting state.

Moreover, luminaire 30 includes a plurality of luminaires 30 grouped into at least two groups. At least one of the plurality of luminaires 30 belongs to both of the two groups. Switch unit 40 includes a plurality of switches 40*a* through 40*d*, each of the plurality of switches 40*a* through 40*d* being assigned with one of the at least two groups to control. The plurality of switches 40*a* through 40*d* include switch 40*b* (one example of the first switch) assigned with group 1 (one example of the first group) and switch 40*c* (one example of the second switch) also assigned with group 1 (one example of the second group). In a case in which: switch 40*b* is assigned with a plurality of items of scene information including scene 1*b* (one example of the first scene information) and switch 40*c* is assigned with a plurality of items of scene information including scene 1*c* (one example of the second scene information), when detector 21 detects the operation of switch 40*c* while controller 22 is controlling the lighting state of each lamp 30 included in group 1 corresponding to switch 40*b* in accordance with the current lighting state indicated by scene 1*b* associated with switch 40*b*, controller 22 changes the lighting state of in the at least one of the plurality of luminaires 30 as a member of group 1 from the current lighting state indicated by scene 1*b* to the next lighting state indicated by scene 1*c* associated with switch 40*c*, and maintains the scene information of the at least one of the plurality of luminaires 30 as a member of group 1 at scene b1.

With this, even when the plurality of switches are set with groups that non-exclusively include luminaires 30, even if one of switches 40*a* through 40*d* is operated and then a different one of switches 40*a* through 40*d* is operated, the lighting state corresponding to the initial switch is maintained (stated differently, the reproduction order is maintained). Accordingly, even if the user changes the switch that he or she operates from among switches 40*a* through 40*d*, the lighting states indicated in the control information corresponding to the switch can be controlled in accordance with the reproduction order set by the user.

Moreover, luminaire 30 includes a plurality of luminaires 30 grouped into at least two groups. At least one of the plurality of luminaires 30 belongs to both of the two groups. Switch unit 40 includes a plurality of switches 40*a* through 40*d*, each of the plurality of switches 40*a* through 40*d* being assigned with one of the at least two groups to control. The plurality of switches 40*a* through 40*d* include switch 40*b* (one example of the first switch) assigned with group 1 (one example of the first group) and switch 40*c* (one example of the second switch) assigned with group 1 (one example of the second group). In a case in which: switch 40*b* is assigned with a plurality of items of scene information including scene 1*b* (one example of the first scene information) and schedule information (one example of the third scene information) indicating an initial state and switch 40*c* is assigned with a plurality of items of scene information including scene 1*c* (one example of the second scene information), when detector 21 detects the operation of switch 40*c* while controller 22 is controlling the lighting state of each lamp 30 included in group 1 corresponding to switch 40*b* in accordance with the current lighting state indicated by scene 1*b* associated with switch 40*b*, controller 22 changes the lighting state of the at least one of the plurality of luminaire 30 as a member of group 1 corresponding to switch 40*c* from the current lighting state indicated by scene 1*b* to the next lighting state indicated by scene 1*c* associated with switch 40*c*, and updates the scene information that corresponds to switch 40*b* from scene 1*b* to the schedule information.

With this, even when the plurality of switches are set with groups that non-exclusively include luminaires 30, the lighting state is updated to the initial lighting state each time the switch that is operated changes from one switch to another among switches 40*a* through 40*d* (stated differently, the phase in the reproduction order is updated to 0). Accordingly, when the user changes the switch that he or she operates from among switches 40*a* through 40*d*, the lighting states indicated in the control information corresponding to the switch can be reproduced starting from phase 1 in the reproduction order.

Moreover, lighting control device 20 receives the control information from terminal device 50 and stores the control information in storage 25.

With this, lighting control device 20 can control the lighting state of luminaire 30 based on the control information received from terminal device 50 and stored in storage 25. Moreover, when changing the control information, the control information included in lighting control device 20 can be updated by receipt of the changed control information from terminal device 50. This makes it possible to simplify and reduce the size of the structure of lighting control device 20 since lighting control device 20 need not include, for example, a display and acquisition unit for input of the control information.

Moreover, as described above, lighting system 10 includes luminaire 30 and lighting control device 20 that controls a lighting state of luminaire 30 based control information stored in storage 25 and terminal device 50 that transmits the control information to lighting control device 20.

With this, lighting control device 20 can transition the lighting state each time one of switches 40*a* through 40*d* is operated, based on control information transmitted from terminal device 50. Since lighting control device 20 according to this embodiment can assign a plurality of items of scene information to a single switch, the required number of switches can be reduced. Moreover, since the lighting state can be transitioned by operating a single switch, the user can easily reproduce the desired lighting state. Accordingly, lighting system 10 improves user-friendliness.

Embodiment 2

Hereinafter, Embodiment 2 will be described with reference to FIG. 9 through FIG. 14. Note that the following description will focus on the points of difference from Embodiment 1. Accordingly, configurations that are essentially the same as in Embodiment 1 are assigned with the same reference signs, and description thereof may be omitted or simplified.

(2-1. Lighting System Configuration)

First, the configuration of a lighting system according to this embodiment will be described with reference to FIG. 9.

Figure 9:
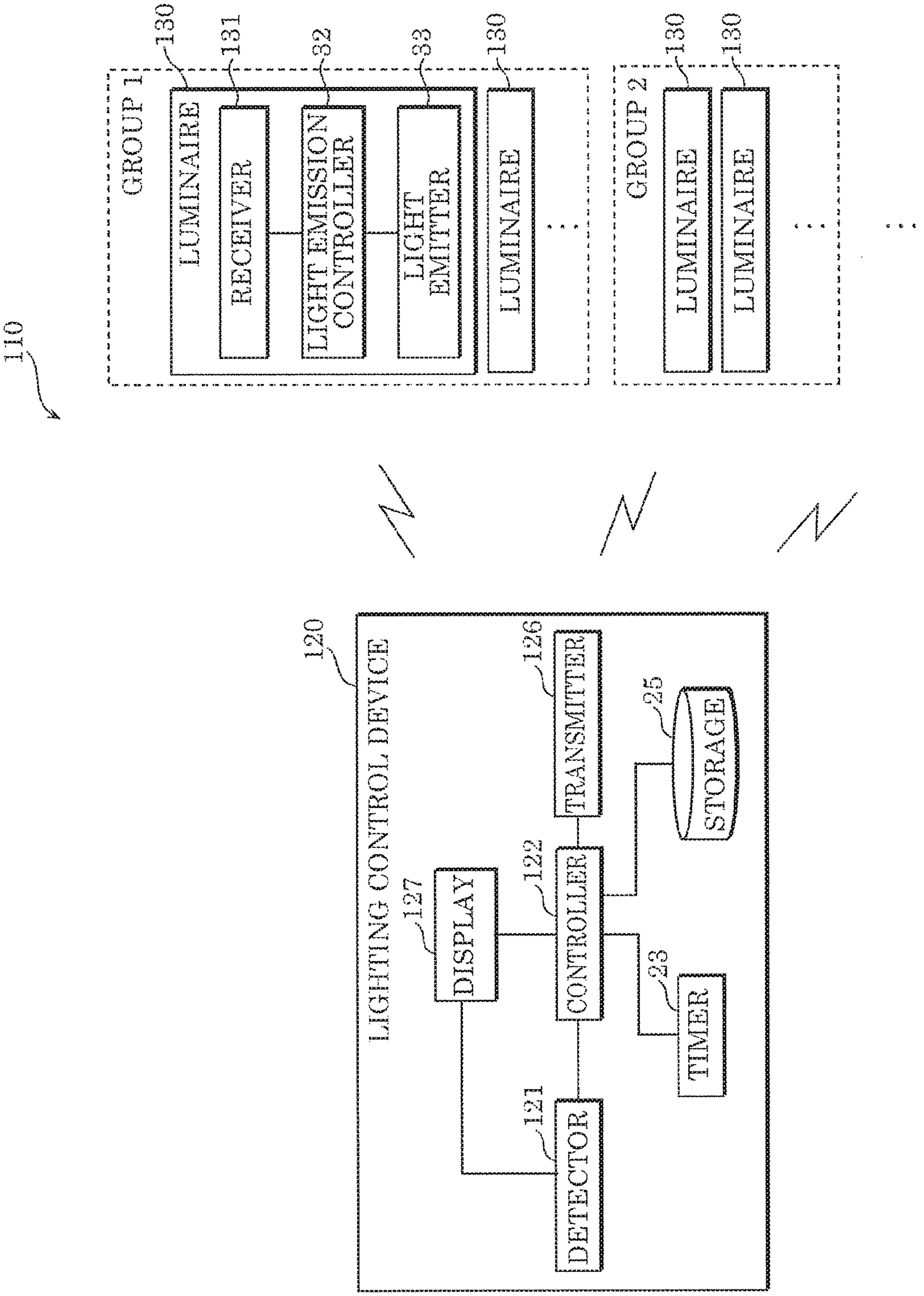
FIG. 9 is a block diagram illustrating a functional configuration of a lighting system according to Embodiment 2.

FIG. 9 is a block diagram illustrating a functional configuration of lighting system 110 according to this embodiment.

As illustrated in FIG. 9, lighting system 110 according to this embodiment includes lighting control device 120 and a plurality of luminaires 130. In lighting system 110, lighting control device 120 includes display 127 as the remote controller. When display 127 is operated by the user, detector 121 detects the operation, and lighting control device 120 controls the plurality of luminaires 130 in accordance with the lighting state corresponding to the detection result. More specifically, when the user operates display 127, lighting control device 120 controls the plurality of luminaires 130 in accordance with the lighting state associated with the operation, based on control information for controlling the lighting state of luminaire 130, which is stored in advance in storage 25. Note that the number of luminaires 130 included in lighting system 110 is not particularly limited. For example, lighting system 110 may include one luminaire 130.

Lighting system 110 includes a schedule function for changing the dimming and color of the plurality of luminaires 130 over time. Next, each element included in lighting system 110 will be described.

(2-1-1. Lighting Control Device)

Lighting control device 120 is a control device that controls a lighting state of luminaire 130 by transmitting a dimming rate and color temperature to luminaire 130. The dimming rate and color temperature are information acquired from the user via display 127, and stored in storage 25.

As illustrated in FIG. 9, lighting control device 120 is a device that is physically separate from luminaires 130 and does not include a lighting function itself. In this embodiment, lighting control device 120 is a handheld terminal. More specifically, lighting control device 120 is a tablet terminal. Note that implementation of lighting control device 120 is not limited to a tablet terminal; lighting control device 120 may be implemented as any portable handheld terminal, such as a smart phone (i.e., a high-functioning cellular phone), a cellular phone, or a controller terminal designed for a specific use.

Lighting control device 120 includes detector 121, controller 122, timer 23, storage 25, transmitter 126, and display 127. Note that timer 23 and storage 25 are essentially the same as those included in lighting control device 20 according to claim 1. Accordingly, description thereof is omitted.

Detector 121 is a user interface that receives from a user, an operation (instruction) relating to a lighting state of luminaire 130 and an operation for generating control information. For example, detector 121 is a touch panel. Detector 121 acquires an instruction (operation) from the user made on an operational screen displayed on display 127. When detector 121 is implemented as a touch panel, detector 121 and display 127 (for example, a liquid crystal display (LCD)) are integrated together.

Detector 121 acquires a selection result from the user in response to the user touching, from among lighting states displayed on display 127, a location in which a lighting state desired to be selected is displayed. Note that, for example, detector 121 is not limited to a touch panel; detector 121 may be implemented as a pressable button, for example.

Note that unlike Embodiment 1, lighting system 110 according to this embodiment does not include a switch fixed to, for example, a wall. Accordingly, detector 121 need not include a function of detecting an operation of luminaire 130 performed via a device other than lighting control device 120.

Controller 122 is a control device that carries out various types of control performed by lighting control device 120. Controller 122 further controls display 127 in addition to controller 22 according to Embodiment 1. For example, controller 122 causes display 127 to display a plurality of tags for selecting a method of selecting one or more luminaires 130 to be controlled, and controls the lighting state of the one or more luminaires 130 to be controlled, which are acquired via selection of a tag by the user.

Controller 122 is a processor that executes a control program stored in storage 25, but may be implemented as a microcomputer or a dedicated circuit, for example.

Transmitter 126 transmits, from lighting control device 120 to luminaire 130, a control signal for controlling a lighting state of luminaire 130. Transmitter 126 is, specifically, a communications circuit (communications module), and transmits the control signal via wireless communication to receiver 131 included in luminaire 130. Note that the communication method used between transmitter 126 (lighting control device 120) and receiver 131 (luminaire 130) is not particularly limited. Examples of the communication method used between transmitter 126 and receiver 131 include wireless communication based on a communications protocol, such as specified low power radio, ZigBee®, Bluetooth®, or WiFi®.

Display 127 is a display device that displays an operational screen for remote operation of luminaire 130. Display 127 is a display device that displays information for controlling luminaire 130 based on control by controller 122 or information for generating control information, and is configured of, for example, a display panel implemented as, for example, an LCD or organic electroluminescent (EL) panel, and a circuit for driving the display panel. Display 127 may display characters, numbers, and/or symbols required to assist the user in inputting control information. Moreover, display 127 may display a still image or a moving image. Note that display 127 is one example of the remote controller that remotely operates the lighting state of luminaire 130.

(2-1-2. Luminaire)

Next, luminaire 130 will be described. Note that the plurality of luminaires 130 included in lighting system 110 each have the same configuration, and the following description will be based on any given luminaire 30. Luminaire 130 includes receiver 131, light emission controller 32, and light emitter 33. Note that light emission controller 32 and light emitter 33 are essentially the same as those included in luminaire 30 according to claim 1. Accordingly, description thereof is omitted.

Receiver 131 receives, from lighting control device 120, a control signal including, for example, the lighting state of luminaire 130. Receiver 131 is, specifically, a communications circuit (communications module), and receives, for example, the control signal via wireless communication from transmitter 126 included in lighting control device 120. Note that the communication method used between receiver 131 (luminaire 130 and transmitter 126 (lighting control device 120)) is not particularly limited. Examples of the communication method used between receiver 131 and transmitter 126 include wireless communication based on a communications protocol, such as specified low power radio, ZigBee®, Bluetooth®, or WiFi®.

(2-2. Operations Performed by Lighting Control Device)

Next, operations performed by lighting control device 120 in lighting system 110 will be described with reference to FIG. 10 through FIG. 14. More specifically, the steps involved in the user operating luminaire 130 by using lighting control device 120 will be described.

Figure 10:
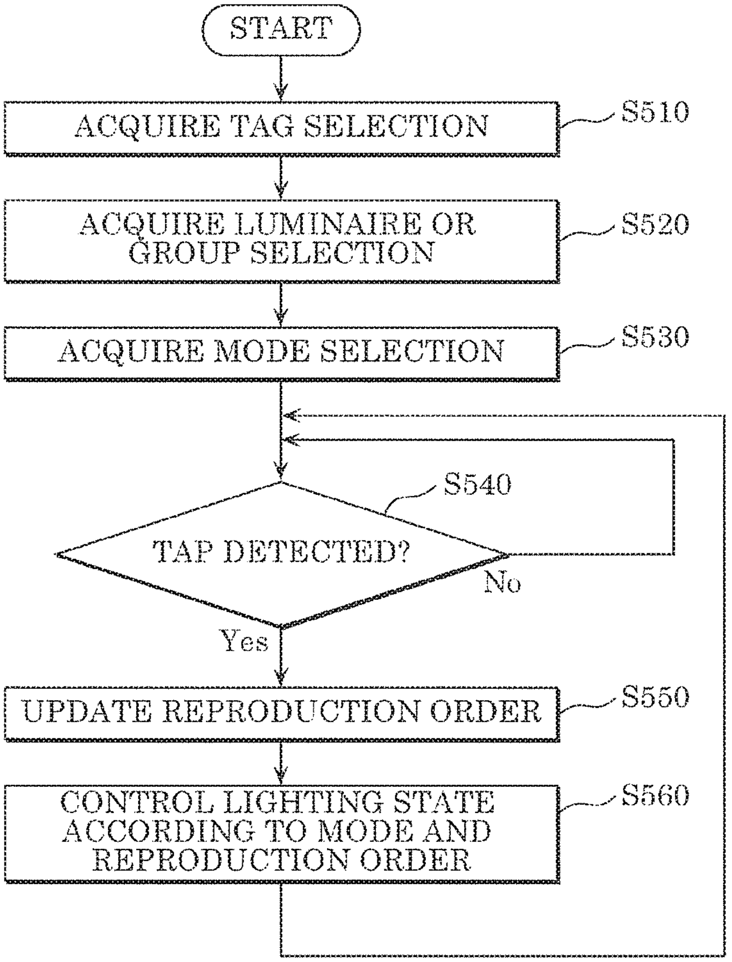
FIG. 10 is a flow chart illustrating operations performed by a lighting control device according to Embodiment 2.
Figure 11:
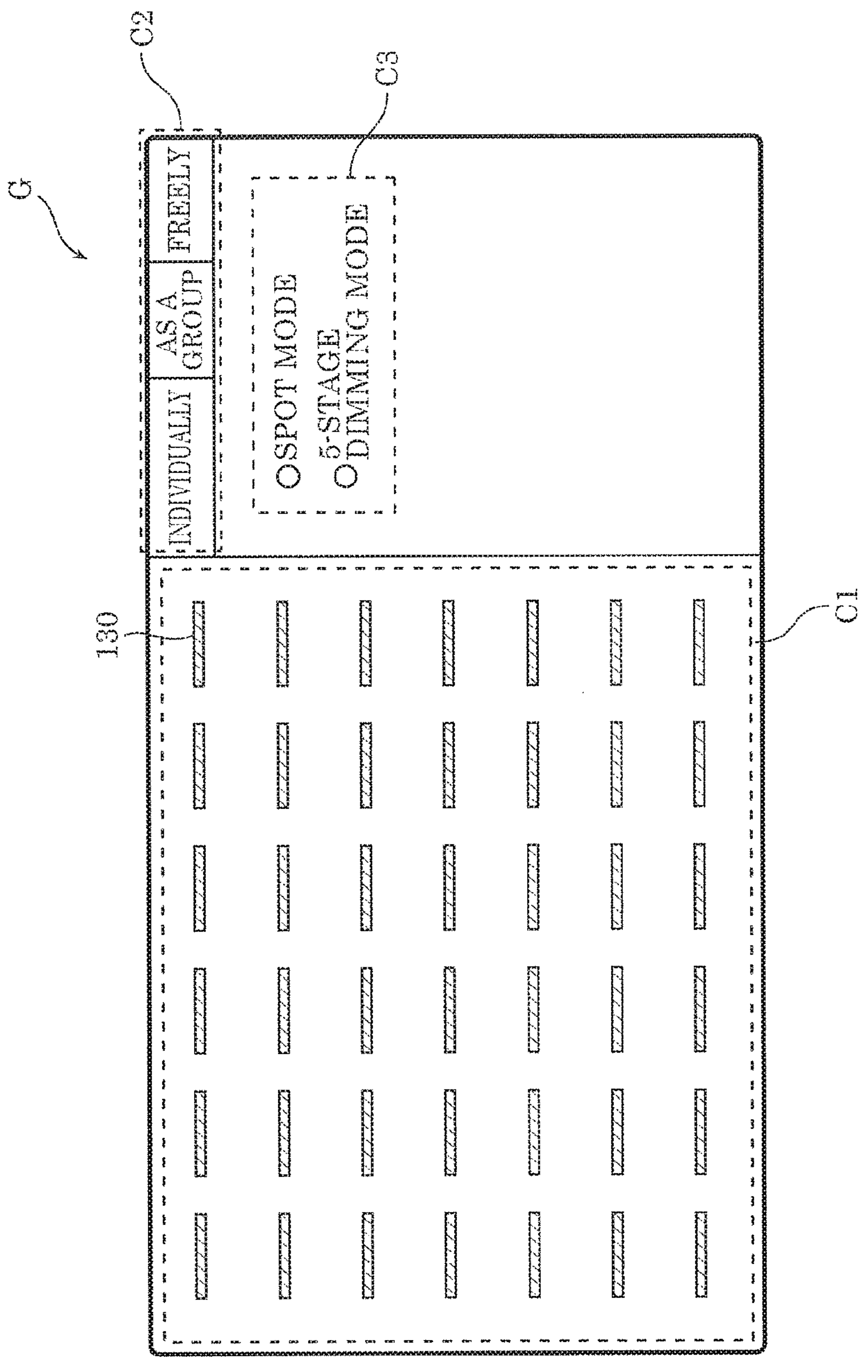
FIG. 11 illustrates one example of an operational screen that is for remotely operating a luminaire and is displayed on a display in a lighting control device according to Embodiment 2.

FIG. 10 is a flow chart illustrating operations performed by lighting control device 120 according to this embodiment. FIG. 11 illustrates one example of operational screen G that is for remotely controlling luminaire 130 and is displayed on display 127 of lighting control device 120 according to this embodiment.

As illustrated in FIG. 11, luminaire information C1, tag information C2, and mode information C3 are displayed in operational screen G. Luminaire information C1 indicates the plurality of luminaires 130 included in lighting system 110. Tag information C2 includes a plurality of tags for selecting, from among the plurality of luminaires 130, one or more luminaires 130 whose lighting state is to be controlled. Mode information C3 indicates a plurality of modes including the reproduction order indicating two or more scene information indicating pre-stored lighting states of luminaires 130 and the order in which each of two or more scene information are reproduced.

Positions of each luminaire 130 indicated by luminaire information C1 approximately correspond to the physical positions of luminaires 130 arranged in, for example, the ceiling. Luminaire information C1 is information that is stored in advance by the user.

Note that information other than luminaire information C1, tag information C2, or mode information C3 may be displayed in operational screen G. Hereinafter, an example will be given in which operational screen G illustrated in FIG. 11 is displayed on display 127. Moreover, although not illustrated in the drawings, detector 121 (for example, a touch panel) is integrated with display 127, on the side of display 127 adjacent the user.

As illustrated in FIG. 10, first, the user determines a method of selecting, from among the plurality of luminaires 130, one or more luminaires 130 whose lighting state is to be controlled. More specifically, detector 121 acquires a selection of a tag included in tag information C2 displayed on display 127 by the user (S510). As illustrated in FIG. 11, three tags are displayed in tag information C2, namely "individually" (one example of the first tag), "as a group" (one example of the second tag), and "freely" (one example of the third tag). The user selects a desired one of these three tags. Then, one or more luminaires 130 to be controlled or one or more groups of luminaires 130 to be controlled, each of which is a collection of luminaires 130, is selected based on the method of selecting one or more luminaires 130 corresponding to the selected tag (S520).

Here, the methods of selecting one or more luminaires 130 to be controlled associated with each of the three tags shown in tag information C2 will be described with reference to FIG. 12A through FIG. 12C. First, the method indicated as "individually" in tag information C2 will be described with reference to FIG. 12A.

Figure 12A:
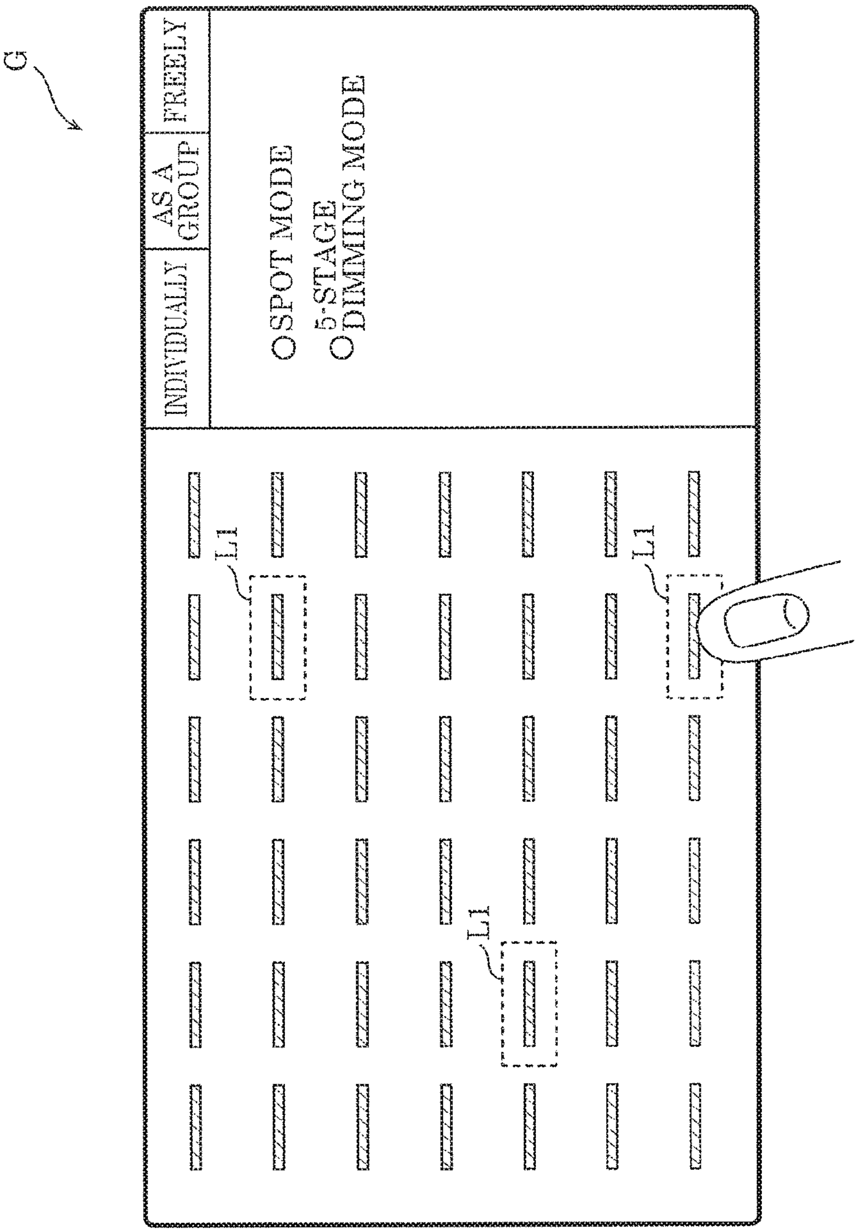
FIG. 12A illustrates one example of a method of selecting one or more luminaires when "individually" is selected in tag information according to Embodiment 2.

FIG. 12A illustrates one example of a method of selecting one or more luminaires 130 when "individually" is selected in tag information C2 according to this embodiment. When "individually" is selected, the user individually selects one or more luminaires 130 to be controlled from among the plurality of luminaires 130 displayed in luminaire information C1. For example, as a result of the user individually tapping one or more luminaires 130 to be controlled from among the plurality of luminaires 130 displayed in luminaire information C1, the tap or taps are detected by detector 121 and one or more luminaires 130 to be controlled are selected. In the example illustrated in FIG. 12A, three luminaires 130 selected as a result of being tapped are surrounded by dashed line L1. Note that one luminaire 130 may be selected, or a plurality of luminaires 130 may be selected.

Since the positions of the plurality of luminaires 130 displayed by luminaire information C1 approximately correspond to the physical positions of the plurality of luminaires 130 attached to the ceiling, the user can easily select which luminaire 130 to control from luminaire information C1. Note that the "tapping" described above is one example of an operation of display 127 (one example of the remote controller) by the user.

Next, the method indicated as "as a group" in tag information C2 will be described with reference to FIG. 12B.

Figure 12B:
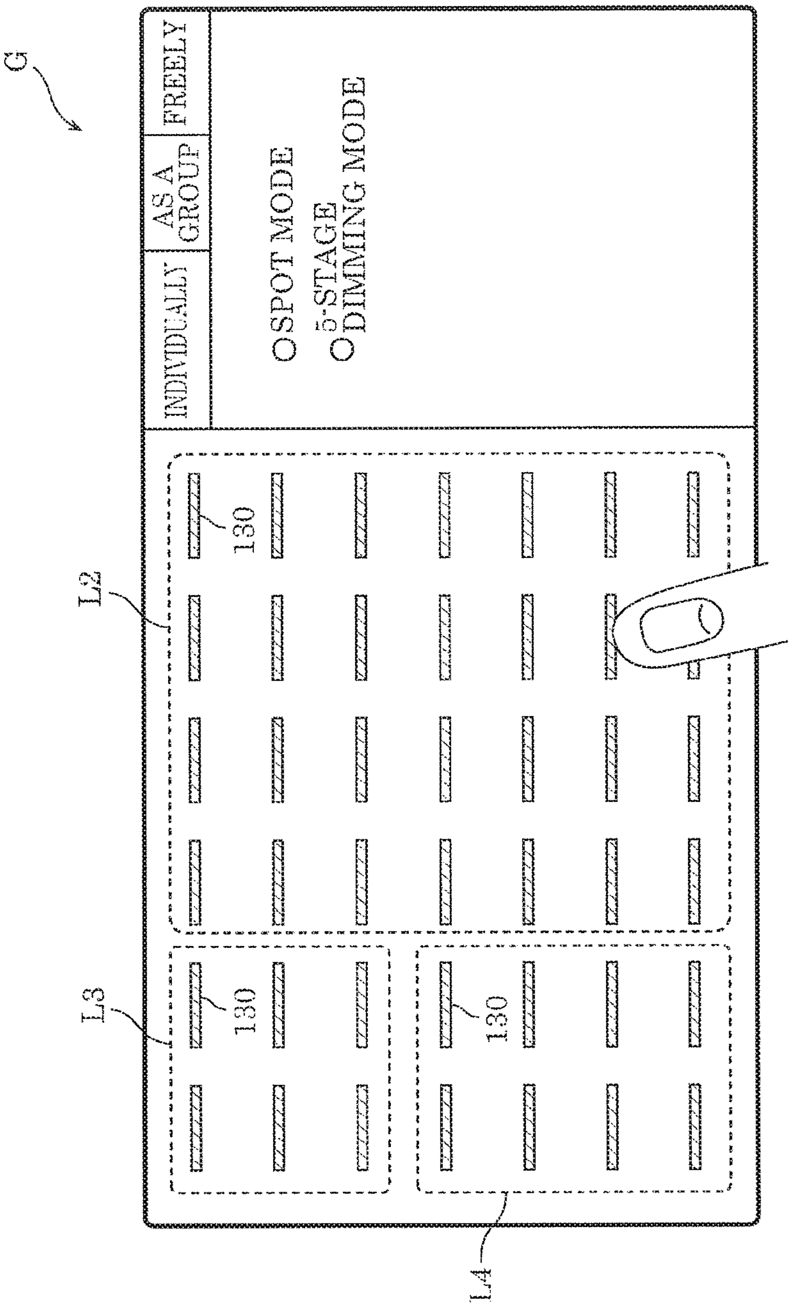
FIG. 12B illustrates one example of a method of selecting one or more luminaires when "as a group" is selected in tag information according to Embodiment 2.

FIG. 12B illustrates one example of a method of luminaires 130 when "as a group" is selected in tag information C2 according to this embodiment. When "as a group" is selected, a group to be controlled from among a plurality of groups, each of which is a collection of luminaires 130 that is stored in advance by the user via detector 121, is selected by the user. When "as a group" in tag information C2 is selected by the user, information on groups stored in advance is displayed on display 127. For example, as one example of information on groups stored in advance, dashed lines surrounding each group of the plurality of luminaires 130 are displayed. As a result of the user tapping the region surrounded by a dashed line (for example, tapping a given luminaire 130 in the region surrounded by the dashed line), a group to be controlled is selected. In the example illustrated in FIG. 12B, three groups surrounded by dashed lines L2, L3, and L4 are displayed, and the user has selected the group surrounded by dashed line L2. This makes it possible for the user to select a plurality of luminaires 30 in a single operation. Note that a plurality of groups may be selected. Moreover, luminaires 130 are exclusively assigned to groups. Stated differently, each luminaire 130 belongs to only one group.

Next, the method indicated as "freely" in tag information C2 will be described with reference to FIG. 12C.

Figure 12C:
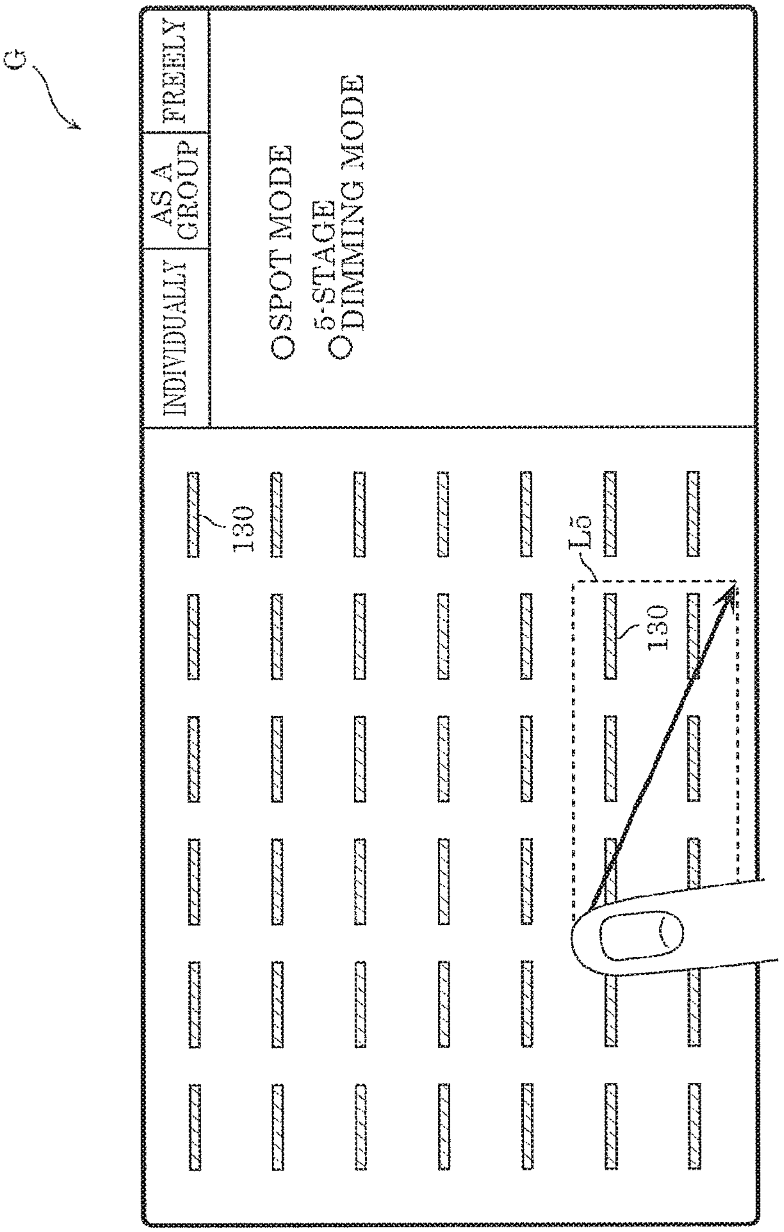
FIG. 12C illustrates one example of a method of selecting one or more luminaires when "freely" is selected in tag information according to Embodiment 2.

FIG. 12C illustrates one example of a method of selecting one or more luminaires 130 when "freely" is selected in tag information C2 according to this embodiment. When "freely" is selected, the user freely selects one or more luminaires 130 to be controlled from among the plurality of luminaires 130 displayed by luminaire information C1. More specifically, as a result of the user making a dragging action on the image displayed by luminaire information C1 (see the arrow in FIG. 12C), detector 121 detects the dragging action and one or more luminaires 130 to be controlled are selected. For example, luminaires 130 included in the region surrounded by dashed line L5 defined by the start and end points of the dragging action are selected as the one or more luminaires 130 to be controlled. With this, the user can freely create a group of luminaires 130 to be controlled with a simple operation, namely a dragging action. Note that the dragging action described above is one example of an operation of display 127 (one example of the remote controller) by the user.

Note that FIG. 12A through FIG. 12C illustrate examples in which selected luminaires 130 to be controlled (one example of the one or more luminaires 130) are displayed as being surrounded by dashed lines, but this example is not limiting. Any embodiment that allows the user to recognize the selected luminaires 130 is acceptable. For example, the display method of the selected luminaires 130 themselves may be changed (for example, the color of the images of the selected luminaires 130 may be changed or the images may be made to flash).

Steps S510 and S520 complete the selection of luminaires 130 to be controlled by lighting control device 120. Hereinafter, the selection of the lighting state for controlling the selected luminaire 130 will be described.

Next, as illustrated in FIG. 10, detector 121 acquires a selection of a predetermined mode from a user from among a plurality of modes including two or more scene information indicating a lighting state of luminaire 130 and reproduction order indicating the order in which the two or more scene information are reproduced, which are stored in advance (S530). In this embodiment, as illustrated in mode information C3, two modes, namely a spot mode and a 5-stage dimming mode, are stored in advance. For example, a mode may be selected by the user tapping a predetermined mode from among the plurality of modes displayed in mode information C3 and detector 121 detecting the tap.

Here, the modes stored in storage 25 will be described with reference to FIG. 13.

FIG. 13 is a flow chart illustrating examples of modes included in lighting control device 120 according to this embodiment. More specifically, (a) in FIG. 13 is one example of control information corresponding to a spot mode, and (b) in FIG. 13 is one example of control information corresponding to a 5-stage dimming mode. As illustrated in (a) and (b) in FIG. 13, the control information corresponding to the modes includes information on the reproduction order and scene information (for example, dimming rate and color temperature).

As illustrated in (a) in FIG. 13, the spot mode includes two scene information. More specifically, the spot mode includes scene 11*a*, which is a dimming rate of 50% and a color temperature of 4000K, and scene 12*a*, which is a dimming rate of 100% and a color temperature of 2700K, Phase 0 in the reproduction order corresponds to scene 11*a* and phase 1 in the reproduction order corresponds to scene 12*a*. Note that phase 0 in the reproduction order (initial phase) is, for example, the phase at the point in time that the user selects a mode or switches modes in step S530. In other words, at the point in time that the user selects a mode or switches modes, luminaire 130 is controlled in accordance with the lighting state illustrated in the scene information (for example, scene 11*a*) corresponding to phase 0 in the reproduction order.

Moreover, as illustrated in (b) in FIG. 13, the 5-stage dimming mode includes five items of scene information. More specifically, the 5-stage dimming mode includes five items of scene information having the same color temperature and different dimming rates. Moreover, just like in (a) in FIG. 13, information on the reproduction order is associated with each item of scene information.

Note that the scene information included in the spot mode and the scene information included in the 5-stage dimming mode are exemplified as indicating different lighting states, but this example is not limiting. The scene information included in the spot mode and the scene information included in the 5-stage dimming mode may partially indicate the same lighting state. For example, the spot mode may include scene 11*b* included in the 5-stage dimming mode. In other words, the plurality of modes may include scene information indicating mutually different lighting states.

Moreover, the modes do not include temporal information for reproduction of the scene information (for example, information relating to a point in time at which the scene information is reproduced or an interval during which the scene information is reproduced).

In step S530, the control information for controlling the selected luminaire 130 is selected. Note that a mode including two or more scene information indicating a lighting state of luminaire 130 and reproduction order indicating an order in which the two or more scene information are reproduced is one example of the first control information. Moreover, hereinafter, an example will be given in which the user performs an operation to switch scene information. In the example, the group indicated by dashed line L2 in FIG. 12B (hereinafter also referred to as group L) is selected in steps S510 and S520, and the 5-stage dimming mode is selected in step S530.

When the 5-stage dimming mode is selected in step S530, controller 122 controls luminaires 130 included in group L in accordance with the lighting state indicated in the scene information associated with phase 0 in the reproduction order. More specifically, controller 122 causes luminaires 130 included in group L to emit light at a dimming rate of 100% and a color temperature of 4000K (scene 11*b*). When detector 121 detects an operation (for example, a tap) performed by the user (yes in step S540) while controller 122 is controlling luminaires 130 included in group L in accordance with the scene information indicated by phase 0 in the reproduction order, controller 122 updates the reproduction order (S550). More specifically, controller 122 updates the phase in the reproduction order from 0 to 1. Controller 122 then causes luminaires 130 included in group L to emit light at the lighting state indicated by a dimming rate of 100% and a color temperature of 4000K (scene 12*b*) and associated with phase 1 in the reproduction order (S560). Stated differently, when detector 121 detects an operation performed by the user while controller 122 is controlling luminaires 130 included in group L according to scene 11*b* (one example of first scene information), controller 122 transitions the lighting state of luminaires 130 included in group L from the lighting state indicated by scene 11*b* to the lighting state indicated by scene 12*b* (one example of second scene information).

Processing then returns to step S540, and each time detector 121 detects an operation of display 127, steps S540 through S560 are executed. With this, the lighting state of luminaires 130 is controlled based on control information each time an operation is performed. Stated differently, each time detector 121 detects (acquires) an operation performed by the user, the lighting state of luminaires 130 included in group L is transitioned from the current lighting state (for example, scene 11*b*) to the next lighting state (for example, scene 12*b*), in accordance with the mode (for example, the 5-stage dimming mode) selected by the user.

Hereinafter, the lighting state of luminaire 130 per operation of display 127 will be described with reference to FIG. 14.

Figure 14:
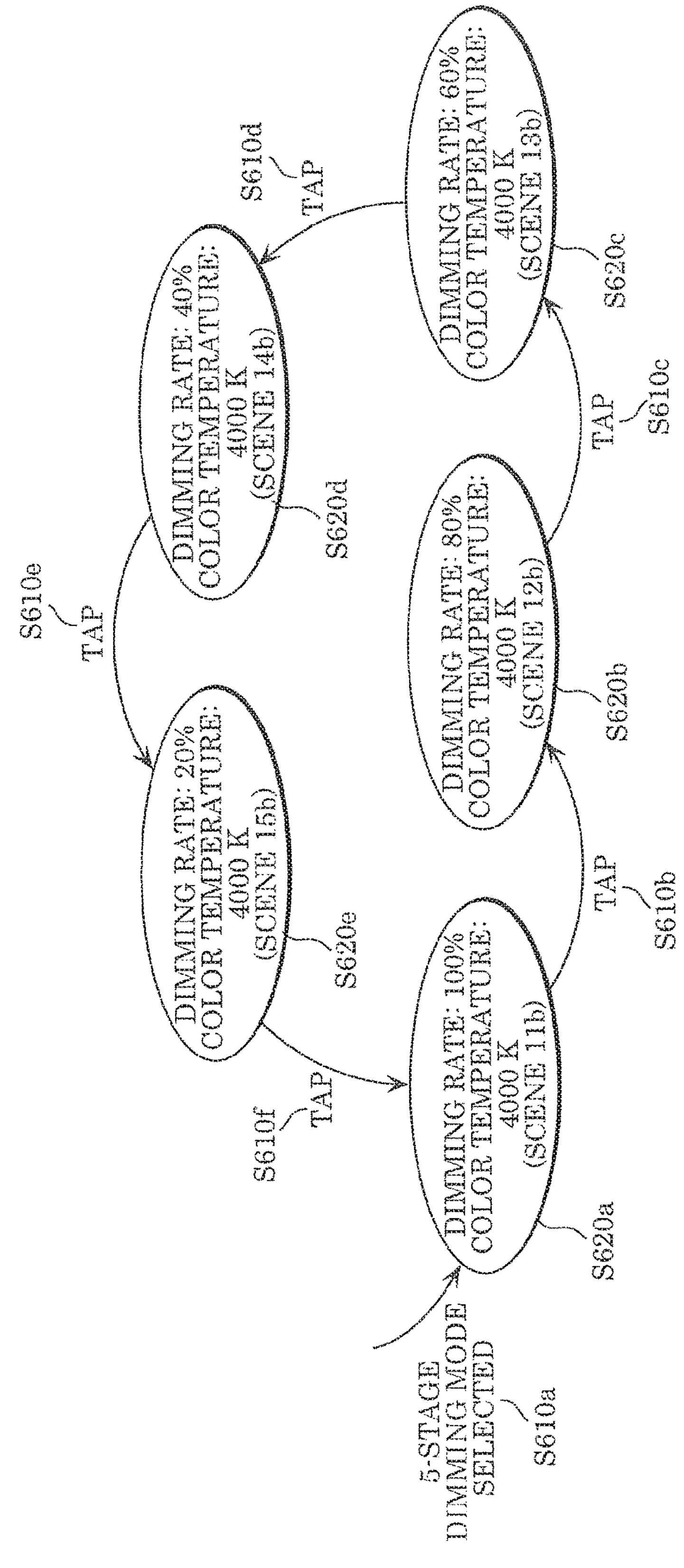
FIG. 14 illustrates transitions between lighting states of a luminaire prompted by operation of a display in a lighting system according to Embodiment 2.

FIG. 14 illustrates transitions between lighting states of luminaire 130 prompted by operation of display 127 in lighting system 110 according to this embodiment. More specifically, FIG. 14 illustrates transitions between lighting states of luminaire 130 each time the operational screen displayed by display 127 is operated. Note that in the following example, the group indicated by dashed line L2 in FIG. 12B (hereinafter also referred to as group L) is selected, and the 5-stage dimming mode is selected in step S530.

First, in the group L included in lighting system 110, as a result of the 5-stage dimming mode being selected (S610*a*), luminaires 130 included in the group L are caused to emit light in accordance with the lighting state associated with phase 0 in the reproduction order. More specifically, luminaires 130 emit light in accordance with the lighting state associated with phase 0 in the reproduction order illustrated in (b) in FIG. 13, which indicates a dimming rate of 100% and a color temperature of 4000K (scene 11*b*) (S620*a*). Note that the lighting state corresponding to phase 0 in the reproduction order may be schedule information.

Next, when display 127 is operated (S610*b*), luminaires 130 emit light at a dimming rate of 80% and a color temperature of 4000K (scene 12*b*), which is the lighting state corresponding to phase 1 after phase 0 in the reproduction order (S620*b*). More specifically, the lighting state of luminaires 130 transitions from the current lighting state indicated by scene 11*b* (one example of first scene information) to the next lighting state indicated by scene 12*b* (one example of second scene information). In other words, when display 127 is operated, luminaires 130 emit light in accordance with the lighting state indicated by scene 12*b*.

When display 127 is operated again (S610*c*), luminaires 130 emit light at a dimming rate of 60% and a color temperature of 4000K (scene 13*b*), which is the lighting state corresponding to phase 2 after phase 1 in the reproduction order (S620*c*). More specifically, the lighting state of luminaires 130 transitions from the current lighting state indicated by scene 12*b* (one example of first scene information) to the next lighting state indicated by scene 13*b* (one example of second scene information). In other words, when display 127 is operated, luminaires 130 emit light in accordance with the lighting state indicated by scene 13*b*.

Similarly, each time display 127 is operated (for example, S610*d* and S610*e*), the lighting state of luminaires 130 transitions (for example, S620*d* and S620*e*). Then when display 127 while scene 15*b* (one example of first scene information) is being executed (S610*f*), luminaires 130 return to the next phase 0 after phase 4 in the reproduction order, and transition to the lighting state indicated by scene 11*b* (one example of second scene information), which is the lighting state corresponding to phase 0 (S620*a*). In other words, when display 127 is operated, luminaires 130 return to the lighting state indicated by scene 11*b*. Thereafter, each time display 127 is operated, the lighting state of luminaires 130 transitions in the order of steps S620*a* through S620*e*. Note that as a result of steps S540 through S560 in FIG. 10 being executed repeatedly in lighting control device 120, the lighting state of luminaires 130 transitions in the order of steps S620*a* through S620*e*.

As described above, each time detector 121 acquires an operation of display 127 from the user, controller 122 transitions luminaires 130 from the current lighting state (lighting state indicated in the first scene information) to the next lighting state (lighting state indicated in the second scene information) in accordance with a predetermined mode selected by the user from among the plurality of modes (for example, the 5-stage dimming mode).

Note that, as described above, the mode (one example of first control information) illustrated in (b) in FIG. 13 includes first scene information indicating the current lighting state and second scene information indicating the next lighting state.

This makes it possible to cause selected luminaire or luminaires 130 to reproduce a plurality of lighting states simply by tapping display 127 to select one mode. In such a case in which only one lighting state is assigned to one scene, there is a need to generate a lot of scene information for various scenes. To change the scene, it is necessary for the user to select the desired scene information from among the large amount of scene information, which is time consuming. Moreover, there is also a method of, after selection of the luminaire or group to be controlled, setting the dimming rate and color temperature indicating the lighting state controlled each time, but setting the dimming rate and color temperature each time is time consuming. Accordingly, lighting control device 120 and lighting system 110 including lighting control device 120 can improve user-friendliness.

Note that the operation from the user is, for example, the tapping of a predetermined region of display 127. For example, the region inside dashed line L2 indicating group L selected in step S520 may be tapped, and, alternatively, a predetermined display for receiving a tap may be displayed on display 127 (operational screen G), and that display may be tapped.

Note that an example was given using FIG. 10 in which luminaire 130 to be controlled is selected (S510 and S520) and then a mode including a lighting state for controlling luminaire 130 is selected (S530), but this example is not limiting; the mode may be selected and then luminaire 130 to be controlled may be selected. Moreover, one or more modes may be stored.

(2-3. Advantageous Effects, Etc.)

As described above, lighting control device 120 is a handheld terminal, and lighting control device 120 further includes, as the remote controller, display 127 (one example of the remote controller) for displaying an operational screen for remotely operating luminaire 130. Detector 121 acquires, as the operation of display 127, an instruction from the user that is made on the operational screen.

With this, even when the lighting state of luminaire 130 is controlled using a handheld terminal, each time an instruction performed by the user on display 127 is acquired, it is possible to control the lighting state of luminaire 130 based on the first control information. More specifically, each time detector 121 detects an operation such as a tap, it is possible to transition the lighting state of luminaire 130 from the current lighting state to the next lighting state. For example, when a plurality of items of scene information assigned with only one lighting state is displayed on display 127 and the user selects one scene among the plurality of items of scene information to control the lighting state of the luminaire, there is a need to search for the desired scene information from among the plurality of items of scene information. On the other hand, with lighting control device 120 according to this embodiment, it is possible to transition the lighting state of luminaire 130 simply by tapping. Accordingly, lighting control device 120 improves user-friendliness.

Moreover, lighting control device 120 includes, as the control information, a plurality of modes including the first scene information for the current lighting state and the second scene information for the next lighting state. The plurality of modes include scene information for mutually different lighting states. Each time detector 121 acquires an operation from the user, controller 122 changes the lighting state of luminaire 130 from the current lighting state to the next lighting state indicated in the second scene information, in accordance with a predetermined mode (for example, the 5-stage dimming mode) selected by the user from among the plurality of modes.

With this, simply by performing a simple operation such as tapping to select a desired mode from among a plurality of modes, the user can transition the lighting states indicated in the plurality of items of scene information included in the mode.

Moreover, luminaire 130 includes a plurality of luminaires 130. Display 127 displays a plurality of tags for selecting, from among the plurality of luminaires 130, at least one luminaire 130 whose lighting state is to be controlled. Controller 122 controls the lighting state of the at least one luminaire 130 acquired via selection of one of the plurality of tags by the user.

This makes it possible for the user to easily select luminaire 130 to be controlled since it is possible to select luminaire 130 to be controlled via a tag.

The plurality of tags include "individually" (one example of the first tag), "as a group" (one example of the second tag), and "freely" (one example of the third tag). The tag "individually" is for individually selecting the at least one luminaire 130 from among the plurality of luminaires 130. The tag "as a group" is for selecting a group including the at least one luminaire 130 from among a plurality of groups of luminaires 130. The tag "freely" is for freely creating a group including the at least one luminaire 130 from among the plurality of luminaires 130.

This makes it possible for the user to easily select at least one luminaire 130 to be controlled since it is possible for the user to select the at least one luminaire 130 to be controlled via selecting one of the plurality of tags in accordance with the at least one luminaire 130 to be controlled.

Moreover, as described above, lighting system 110 includes luminaire 130 and lighting control device 120 that controls a lighting state of luminaire 130 based control information stored in storage 25.

This makes it possible to transition the lighting state of luminaire 130 each time display 127 is operated, based on the control information stored in storage 25. Accordingly, lighting system 110 improves user-friendliness.

Other Embodiments

Hereinbefore, a lighting control device and a lighting system including the lighting control device have been described based on embodiments, but the present disclosure is not limited to the above embodiments.

For example, in the above embodiments, the lighting control device is implemented as a device that is physically separate from the luminaire, but the lighting control device may be internally provided in the luminaire. In other words, the lighting control device may be implemented as an element of the luminaire.

Moreover, in the above embodiments, the plurality of luminaires included in the lighting system are exemplified as, but not limited to, having the same configuration. The plurality of luminaires included in the lighting system may have different configurations. For example, in Embodiment 1, the plurality of luminaires are exemplified as not including wireless communications units, but some or all of the plurality of luminaires may include a wireless communications unit.

Moreover, in the above embodiments, an example is given in which a plurality of lighting states and information relating to the order in which the lighting states are to be reproduced are assigned to each of four switches, but this example is not limiting. For example, when the lighting system includes a switch unit that includes a plurality of switches, it is sufficient so long as a plurality of lighting states and information relating to the order in which the lighting states are to be reproduced are assigned to at least one switch.

Moreover, in the above embodiments, the control information is exemplified as, but not limited to, including first control information and second control information. For example, the second control information may be omitted from the control information. Stated differently, the control information may exclusively include the first control information. In other words, the control information need not include the schedule information.

Moreover, in the examples given in the above embodiments, each time the remote controller is operated, the lighting state is immediately transitioned to the next lighting state indicated in the next scene information (second scene information), but this example is not limiting. For example, when the remote controller is operated, the scene information may be switched from the lighting state indicated in the current scene information (first scene information) to the lighting state indicated in the next scene information in stages over time. In other words, a fade length may be set.

Moreover, in the above embodiments, scene information is exemplified as including dimming rate and color temperature, but the scene information may include at least one of the dimming rate and the color temperature.

Moreover, in Embodiment 1, the communication between the lighting control device and the terminal device is exemplified as, but not limited to, wireless communication. For example, instead of wireless communication, wired communication, such as power line communication (PLC) or communication over a wired LAN, may be used.

Moreover, in the above embodiments, the lighting system is exemplified as, but not limited to, including schedule function that changes the dimming and color of the plurality of luminaires over time. The lighting system need not include a schedule function.

Moreover, the processing order of the operations performed by the terminal device and lighting control device in the above embodiments is merely one example. The processing order may be rearranged, and, alternatively, the processes may be performed in parallel.

Moreover, in the above embodiments, one group is exemplified as being assigned to one switch (for example, switch 40*a*), but this example is not limiting. A plurality of groups may be assigned to one switch. For example, the lighting state of luminaires in group 1 may be controlled when the switch is operated once, and the lighting state of luminaires in group 2 different from group 1 may be controlled when the switch is operated once again. Note that the lighting state of each of the luminaires in group 1 and group 2 may be the same and, alternatively, may be different.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting control device that controls a lighting state of a luminaire, the lighting control device comprising:

a storage that stores control information for sequentially changing the lighting state of the luminaire;

a detector that detects an operation of a remote controller that remotely operates the lighting state of the luminaire; and a controller that controls the lighting state of the luminaire based on the control information, wherein:

the remote controller includes a switch, the detector detects an operation of the switch, the control information includes first scene information for a current lighting state and second scene information for a next lighting state, the switch is assigned with the first scene information and the second scene information, and each time the detector detects the operation of the switch, the controller changes the lighting state of the luminaire from the current lighting state to the next lighting state indicated in the second scene information.

2. The lighting control device according to claim 1, wherein the remote controller is fixed to a part of a building.

3. The lighting control device according to claim 2, wherein:

each of the first scene information and the second scene information is one of non-time-changing scene information in which the lighting state does not change with time and time-changing scene information in which the lighting state changes with time, the switch includes a lighting unit including a first lighting mode and a second lighting mode different from the first lighting mode, and the controller causes the lighting unit to emit light in the first lighting mode when controlling the luminaire in accordance with non-time-changing scene information, and causes the lighting unit to emit light in the second lighting mode when controlling the luminaire in accordance with time-changing scene information.

4. The lighting control device according to claim 1, wherein the lighting control device receives the control information from a terminal device and stores the control information in the storage.

5. The lighting control device according to claim 1, wherein:

the lighting control device is a handheld terminal, the lighting control device further comprises, as the switch of the remote controller, a display that displays an operational screen for remotely operating the luminaire, the operations screen is assigned with the first scene information and the second scene information, and the detector acquires, as the operation, an instruction from a user that is made on the operational screen.

6. The lighting control device according to claim 5, wherein:

the lighting control device includes, as the control information, a plurality of modes including the first scene information for the current lighting state and the second scene information for the next lighting state, the plurality of modes include scene information for mutually different lighting states, and each time the detector acquires an operation from the user, the controller changes the lighting state of the luminaire from the current lighting state to the next lighting state indicated in the second scene information, in accordance with a predetermined mode selected by the user from among the plurality of modes.

7. The lighting control device according to claim 5, wherein:

the luminaire comprises a plurality of luminaires, the display displays a plurality of tags for selecting, from among the plurality of luminaires, at least one luminaire whose lighting state is to be controlled, and the controller controls the lighting state of the at least one luminaire acquired via selection of one of the plurality of tags by the user.

8. The lighting control device according to claim 7, wherein:

the plurality of tags include a first tag, a second tag, and a third tag, the first tag is for individually selecting the at least one luminaire from among the plurality of luminaires, the second tag is for selecting a group of luminaires including the at least one luminaire from among a plurality of groups of luminaires, and the third tag is for freely creating a group of luminaires including the at least one luminaire from among the plurality of luminaires.

9. A lighting system, comprising:

a luminaire; and the lighting control device according to claim 1 that controls a lighting state of the luminaire based on control information stored in a storage.

10. The lighting system according to claim 9, further comprising:

a terminal device that transmits the control information to the lighting control device.

11. The lighting control device according to claim 1, wherein:

the switch comprises a plurality of switches, and each of the plurality of switches is assigned with a plurality of items of scene information including scene information for mutually different lighting states.

12. The lighting control device according to claim 1, wherein:

each of the first scene information and the second scene information is one of non-time-changing scene information in which the lighting state does not change with time and time-changing scene information in which the lighting state changes with time, the switch is further assigned with the time-changing scene information, and the controller changes the lighting state of the luminaire to the lighting state indicated in the time-changing scene information when power starts being supplied to the luminaire.

13. The lighting control device according to claim 12, wherein the power is supplied to the luminaire by operation of a terminal device.

14. The lighting control device according to claim 1, wherein the lighting control device does not include the remote controller.

15. The lighting control device according to claim 7, wherein the display further displays (i) luminaire information indicating a location of each of the plurality of luminaires and (ii) the plurality of tags on a same screen.

16. A lighting control device that controls a lighting state of a luminaire, the lighting control device comprising:

a storage that stores control information for sequentially changing the lighting state of the luminaire;

a detector that detects an operation of a remote controller that remotely operates the lighting state of the luminaire; and a controller that controls the lighting state of the luminaire based on the control information, wherein:

the control information includes first scene information for a current lighting state and second scene information for a next lighting state, each time the detector detects the operation of the remote controller, the controller changes the lighting state of the luminaire from the current lighting state to the next lighting state indicated in the second scene information, the luminaire comprises a plurality of luminaires grouped into at least two groups including a first group and a second group, at least one of the plurality of luminaires belonging to the first group and the second group, the remote controller includes a plurality of switches, each of the plurality of switches being assigned with one of the at least two groups to control, the plurality of switches includes a first switch assigned with the first group and a second switch assigned with the second group, and in a case in which: the first switch is assigned with a plurality of items of scene information including the first scene information and the second switch is assigned with a plurality of items of scene information including the second scene information, when the detector detects the operation of the second switch while the controller is controlling the lighting state of each luminaire included in the first group in accordance with the current lighting state indicated in the first scene information associated with the first switch, the controller changes the lighting state of the at least one of the plurality of luminaires as a member of the second group from the current lighting state indicated in the first scene information to the next lighting state indicated in the second scene information associated with the second switch, and maintains the scene information of the at least one of the plurality of lamps as a member of the first group at the first scene information.

17. A lighting control device that controls a lighting state of a luminaire, the lighting control device comprising:

a storage that stores control information for sequentially changing the lighting state of the luminaire;

a detector that detects an operation of a remote controller that remotely operates the lighting state of the luminaire; and a controller that controls the lighting state of the luminaire based on the control information, wherein:

the control information includes first scene information for a current lighting state and second scene information for a next lighting state, each time the detector detects the operation of the remote controller, the controller changes the lighting state of the luminaire from the current lighting state to the next lighting state indicated in the second scene information, the luminaire comprises a plurality of luminaires grouped into at least two groups including a first group and a second group, at least one of the plurality of luminaires belonging to the first group and the second group, the remote controller includes a plurality of switches, each of the plurality of switches being assigned with one of the at least two groups to control, the plurality of switches includes a first switch assigned with the first group and a second switch assigned with the second group, and in a case in which: the first switch is assigned with a plurality of items of scene information including the first scene information and third scene information indicating an initial state and the second switch is assigned with a plurality of items of scene information including the second scene information, when the detector detects the operation of the second switch while the controller is controlling the lighting state of each lamp included in the first group in accordance with the current lighting state indicated in the first scene information associated with the first switch, the controller changes the lighting state of the at least one of the plurality of luminaires as a member of the second group from the current lighting state indicated in the first scene information to the next lighting state indicated in the second scene information associated with the second switch, and updates the scene information that corresponds to the first switch from the first scene information to the third scene information.

* * * * *